United States Patent [19]

Mabee

[11] Patent Number: 5,172,798
[45] Date of Patent: Dec. 22, 1992

[54] ELECTRICAL ACTUATION SYSTEM FOR A DRIVE

[75] Inventor: Brian D. Mabee, Sterling Heights, Mich.

[73] Assignee: Easom Engineering and Manufacturing Corporation, Clinton Township, Macomb County, Mich.

[21] Appl. No.: 895,344

[22] Filed: Jun. 8, 1992

[51] Int. Cl.⁵ .............. F16D 67/06; F16D 27/10; F16D 27/12; F16H 37/06

[52] U.S. Cl. .................... 192/18 B; 74/661; 188/161; 188/171; 192/48.2; 192/48.91; 192/84 C

[58] Field of Search ............. 192/84 C, 48.2, 12 D, 192/18 B, 48.91; 188/161, 171; 74/661

[56] References Cited

U.S. PATENT DOCUMENTS

| | | | |
|---|---|---|---|
| 987,954 | 3/1911 | Brush | 192/70.2 |
| 2,464,129 | 3/1949 | Goettisheim | 192/18 B |
| 2,547,137 | 4/1951 | Ochtman | 192/84 C |
| 2,658,593 | 11/1953 | Doebeli | 192/48.91 X |
| 2,840,205 | 6/1958 | Linke | 192/18 B |
| 3,251,441 | 5/1966 | Winter | 192/18 B |
| 3,270,265 | 8/1966 | McNulty | 192/1.39 X |
| 3,412,834 | 11/1968 | Root | 192/70.19 X |
| 4,079,820 | 3/1978 | Mattli | 192/84 C X |
| 4,125,178 | 11/1978 | Monks | 192/18 A |
| 4,181,201 | 1/1980 | McCarthy | 188/171 |
| 4,352,415 | 10/1982 | Powell | 188/156 |
| 4,458,794 | 7/1984 | Yater | 192/18 A |
| 4,463,841 | 8/1984 | Kelley | 192/18 A |
| 4,577,738 | 3/1986 | Yater | 192/18 A |
| 4,607,736 | 8/1986 | Kelley | 192/18 A |
| 4,676,356 | 6/1987 | Beccaris et al. | 192/70.28 |
| 4,739,865 | 4/1988 | Yater et al. | 192/18 A |
| 4,765,448 | 8/1988 | Sommer | 192/18 A |
| 4,821,847 | 4/1989 | Langdon et al. | 188/171 |
| 4,921,078 | 5/1990 | Sommer | 188/171 |
| 4,938,321 | 7/1990 | Kelley et al. | 188/171 |

FOREIGN PATENT DOCUMENTS 173553 12/1960 Sweden ............. 188/171

OTHER PUBLICATIONS

Oil Shear Electric Brake Brochure of Force Control Ind, Inc. p. 3, dated before Jan. 1, 1992.
Spiral Retaining Rings Catalog of Smalley Steel Ring Co., pp. 34–35, dated before Jan. 1, 1992.
Service manual of Two Speed Drive II of Force Control Ind, Inc., pp. 1–4, dated Apr. 1991.
Warner "Clutches, Brakes and Controls Master Catalog" dated before Jan. 1, 1992 of Warner Electric Division of Dana Corp.

*Primary Examiner*—Rodney H. Bonck
*Attorney, Agent, or Firm*—Peter D. Keefe

[57] ABSTRACT

An electrical actuation system for a drive utilizing one or more disc stacks having annular discs alternately connected with two or more drive components. A disc stack is directly selectively clamped by an armature of an armature assembly being magnetically attracted to an electromagnetic coil of an electromagnetic coil assembly upon energization of an excitation current in the electromagnetic coil. The armature has a zero air gap with respect to the electromagnetic coil when the disc stack is clamped. A plurality of armature springs are carried with the armature assembly and are compressed when the armature assembly biases against the disc stack, thereby accommodating wear of the discs. Clamping of the disc stack results in the two drive components connected therewith being interconnected. Upon the excitation current being switched off, the disc stack is no longer clamped and the two drive components are now unconnected. The electrical actuation system may be used in a clutch, brake or any number of clutch and brake combinations.

42 Claims, 6 Drawing Sheets

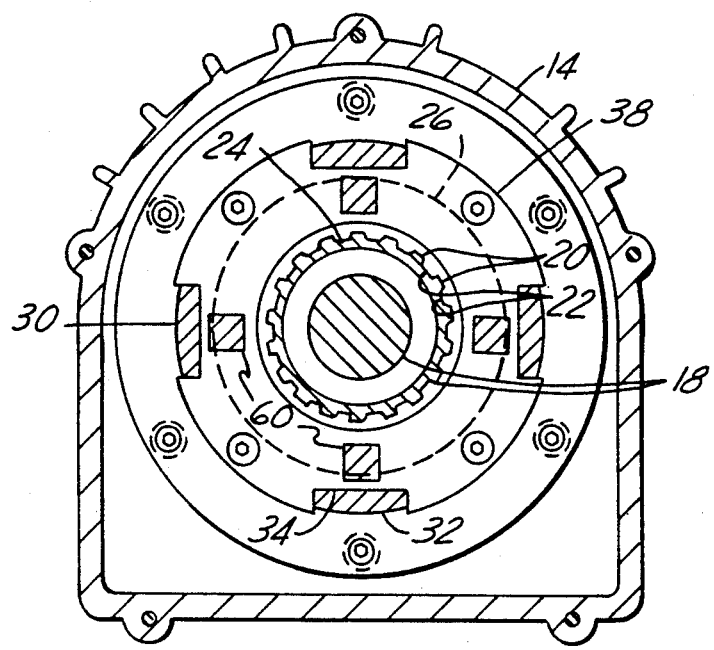
FIG.3
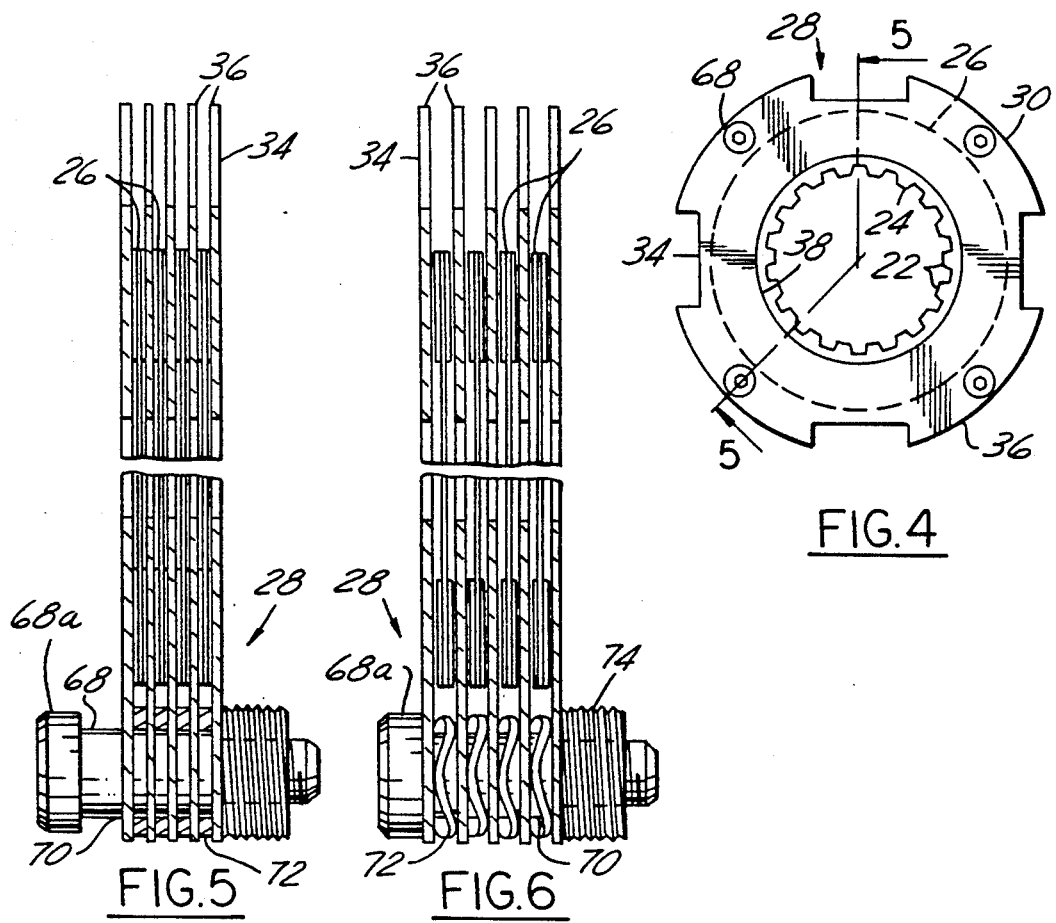
FIG.4
FIG.5  FIG.6

| FUNCTION | COIL #1 | COIL #2 |
|---|---|---|
| HIGH SPEED (RELEASE BRAKE) | ON | OFF |
| LOW SPEED (RELEASE BRAKE) | OFF | ON |
| BRAKE | OFF | OFF |

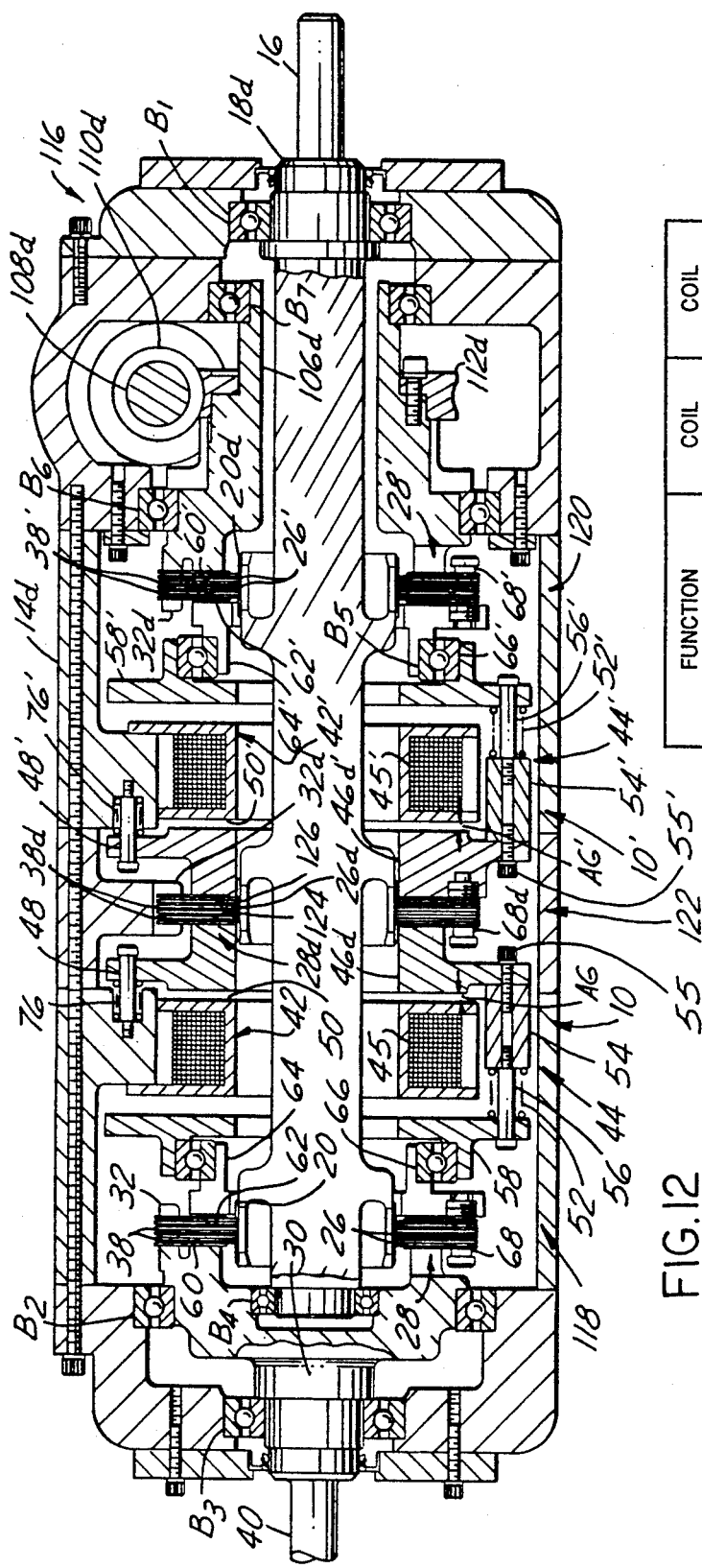

ELECTRICAL ACTUATION SYSTEM FOR A DRIVE

BACKGROUND OF THE INVENTION

1. Field of the invention:

The present invention relates to drives for moving tooling and other loads which are normally present in manufacturing environments, and more particularly to drives incorporating brake and clutch mechanisms which selectively interface with one or more electric motors. Still more particularly, the present invention relates to an electrical actuation system for a drive in which clutching, braking or a combination thereof is effected by direct electromagnetic compression of an oil shear disc stack, wherein the excitation current of the electromagnetic coil is minimized because the working air gap is eliminated during actuation. More particularly still, the present invention relates to a drive of the class aforesaid, in which an armature assembly includes compression springs for supplying a predetermined level of compressive force on the disc stack while the working air gap is zero, independent of wear of the disc stack over the normal life thereof.

2. Description of the Prior Art

Movement of tools and other machinery in manufacturing environments is facilitated by drives which permit both rapid movement and slow movement, coupled with a brake function. Such drives permit rapid job cycling with accurate load positioning, while providing a maximum expected operational life of the drive. Typically, such drives interface with position locating apparatus which convert rotation into translation, such as by a ballscrew apparatus. Drives of this type incorporate two electric motors: a primary drive motor used for rapid movement and a secondary drive motor coupled through a gear reduction unit used for slow movement. These drives further incorporate a brake for precisely stopping movement and a clutch for selectively engaging the primary and secondary drive motors. The clutch is structured in the form of interleaved annular discs of two annular disc sets which collectively form a stack, in which one set of annular discs is attached to a shaft connected with the secondary drive motor, while the other set of annular discs is attached to a shaft connected with the primary drive motor, and a mechanism is used to selectively control clamping pressure between adjacent annular discs. The brake is structured analogously to the clutch, except that one annular disc set is attached to a stationary housing component.

The disc stacks utilized in the brake and clutch rely upon transmission of torque from one set of annular discs to the other set of annular discs. Some systems rely upon dry frictional engagement between adjacent annular discs to provide torque transfer, this is ordinarily considered unacceptable because of excessive wear and tendency for the dry friction material coating the annular discs to inconsistently rub relative to each other, resulting in a "stick-slip" jerking action which makes accurate positioning almost impossible to achieve. Systems which rely on dry frictional engagement between the annular disc sets generally are those which utilize low clamping force actuation systems, such as those which are electromagnetically operated. Accordingly, most conventional systems rely upon disc stacks utilizing an oil shear principle, in which adjacent annular discs brought into proximity by a clamping actuator, such as a pneumatic device, mutually transmit torque by a thin film of oil therebetween due to viscous shear of the oil film. The oil serves to reduce annular disc wear, provides consistent force transmission and conducts away waste heat. Accordingly, oil shear operated disc stacks have become industry standard, although there is involved a high degree of cost and installation complexity.

An example of a conventional two-speed drive is described in U.S. Pat. No. 4,463,841 to Kelley, dated Aug. 7, 1984. In this drive, a secondary electric motor drives through a gear reducer to an input shaft which connects with a clutch. The clutch is composed of an oil shear operated disc stack, in which one annular disc set is connected with the input shaft and the other annular disc set, interleaved with the first annular disc set, is connected with an output shaft. The output shaft connects with a primary electric motor, which, in turn, provides an output shaft for the drive. The output shaft interfaces with a brake composed of a second oil shear operated disc stack, in which one annular disc set is connected with the output shaft and the other annular disc set, interleaved with the first, is connected with the housing. A pneumatically operated bi-directional piston is axially moved to selectively apply annular disc clamping pressure to either the clutch disc stack or the brake disc stack. In the former mode, the secondary electric motor is able to drive the output shaft, while in the latter mode, rotation of the output shaft is braked. In the neutral position of the bi-directional piston, the brake is off, the secondary electric motor unconnected, and the primary electric motor is used as the prime mover. Selective movement of the bi-directional piston in concert with selective actuation of the electric motors enables an operator to achieve rapid and precise relocation of a load.

While the drive described in U.S. Pat. No. 4,463,841 operates acceptably in many situations, it has several significant problems which have been only partly addressed in the prior art.

One problem is that in the event of a power or fluid pressure failure, it is possible for the drive to continue spinning without the benefit of a brake. This problem was at least partly solved by a drive described in U.S. Pat. No. 4,607,736 to Kelley, dated Aug. 26, 1986, in which the brake stack is nominally clamped by biasing action of springs on the bi-directional piston, and which biasing action is overcome as long as fluid pressure is maintained in the pneumatic lines. This solution pertains, accordingly, only to pressurized fluid operated brake systems.

Another problem is that an external supply of pressurized fluid must be provided to actuate the bi-directional piston. This problem was solved by a drive described in U.S. Pat. No. 4,739,865 to Yater et al, dated Apr. 26, 1988, which discloses a drive incorporating clutch and brake components as generally described above and further incorporating a self-contained hydraulic pump system for actuating the bi-directional piston that controls clamping of the disc stacks. Accordingly, this drive eliminates the need for an external pressurized fluid source. However, this drive has the added costs of an internally provided pressurized fluid source, and it is not suited for use in two speed drives as it requires a motor to be running at the input shaft in order to actuate the bi-directional piston.

An improved drive is that disclosed in co-pending application Ser. No. 07/846,546 filed on Mar. 5, 1992, hereby incorporated by reference. Therein disclosed is a two-speed drive which utilizes an electromagnetically operated control system which is wired with the respective drive motors, is automatically braked in the event of a loss of power, is provided with clutch and brake disc stacks which are pre-assembled, and is provided with a manual over-ride which allows for manual operation.

The two-speed drive includes a primary drive motor which is connected at one end to an external drive shaft and at an opposite end to a primary clutch shaft. The primary clutch shaft is connected with a first set of annular discs of an oil shear clutch disc stack. A secondary clutch shaft is connected with a second set of annular discs of the clutch disc stack. The clutch disc stack is biased by springs so as to be in a nominally clamped mode, which is released by operation of a clutch electromagnetic coil assembly. The secondary input shaft is connected through a gear reduction unit to a primary input shaft that is connected at one end to a secondary drive motor and at the other end to a first set of annular discs of an oil shear brake disc stack. A second set of annular discs of the brake disc stack is connected to a stationary housing component. The brake disc stack is biased by springs to be in a nominally clamped mode, which is released by operation of a brake electromagnetic coil assembly. The clutch and brake disc stacks are pre-assembled and held in a pre-aligned orientation by operation of a plurality of alignment pins and wave washers carried on the alignment pins. A manual over-ride is provided adjacent the brake electromagnetic coil assembly which permits selective release of spring biasing with respect to the brake disc stack so that a manual crank may be operated.

High speed positioning is accomplished by energization of the primary drive motor as well as energization of a primary electromagnetic coil of the clutch electromagnetic coil assembly. Braking is achieved by de-energizing the primary drive motor and the primary electromagnetic coil. Low speed positioning is accomplished by energization of the secondary drive motor (while the primary drive motor and primary electromagnetic coil are de-energized) and energization of a secondary electromagnetic coil of the brake electromagnetic coil assembly. Braking is achieved by de-energizing the secondary drive motor and the secondary electromagnetic coil.

It is well known that magnetic reluctance of a magnetic circuit is many times larger for an air gap of any size than for the case of a magnetic circuit having a zero air gap. Consequently, large excitation currents are needed to produce a desired level of magnetic field strength, whereas much smaller excitation currents are needed to produce the same magnetic field strength when there is no air gap in the magnetic circuit. The amount of current is important because heating losses are proportional to the square of the current.

As a consequence, it is conventional practice, as exemplified by the devices described hereinabove, to utilize springs to provide clamping of the disc stack, while the electromagnetic coil is used to overcome the spring pressure to thereby disengage clamping of the disc stack. That is, the electromagnetic coil is not used to directly supply clamping force to the disc stack, but rather to disengage clamping of the disc stack. The reason for this is that over time the discs of the disc stack will wear, so that a predetermined movement of an armature relative to an electromagnet pole piece by which is provided a zero air gap may initially provide a correct clamping force, but over time will not provide the correct clamping force. Ergo, since compressed springs can accommodate disc wear, conventional electromagnetically actuated drive systems use compressed springs to supply clamping force to the disc stack, and use electromagnetics to disengage the spring provided clamping force, primarily because the disengagement movement of the armature is not wear sensitive and so the air gap can, in this mode of operation, go to zero.

Accordingly, there is no practical means known in the present art to provide an electromagnetic actuation system for a drive in which the electromagnet directly supplies clamping force to the disc stack.

SUMMARY OF THE INVENTION

The present invention is an electromagnetic actuation system for a drive in which the electromagnet directly supplies clamping force to the disc stack and yet the air gap is zero during actuation. In this regard, the drive utilizes one or more disc stacks having annular discs alternately connected with two or more drive components, at least one of which being rotatably connected with the drive. The disc stack is directly selectively clamped by an armature of an armature assembly being magnetically attracted to an electromagnetic coil of an electromagnetic coil assembly upon energization of an excitation current in the electromagnetic coil. The armature has a zero air gap with respect to the electromagnetic coil when the disc stack is clamped. A plurality of armature springs are carried with the armature assembly and are compressed when the armature assembly biases against the disc stack, thereby accommodating wear of the discs. Clamping of the disc stack results in the two drive components connected therewith being interconnected. Upon the excitation current being switched off, the disc stack is no longer clamped and the two drive components are now unconnected. The electrical actuation system may be used in a clutch, brake or any number of clutch and brake combinations.

According to a first preferred drive unit embodiment of the present invention, a clutch unit for a drive is provided which engages with respect to one or more electric motors. A housing is provided inside of which is rotatably mounted an external primary drive shaft. Connected to the external primary drive shaft is an internal primary drive shaft. The internal primary drive shaft is connected with a first set of annular discs of an oil shear clutch disc stack. An internal secondary drive shaft is connected with a second set of annular discs of the clutch disc stack. The clutch disc stack is clampably biased by providing excitation current to a clutch electromagnetic coil assembly, and is released by deactivating the excitation current of the clutch electromagnetic coil assembly. During excitation, an armature assembly moves with respect to the electromagnetic coil assembly so that the air gap goes to zero thereby allowing the excitation current to be substantially reduced, while armature springs movable with the armature assembly compress biasably with respect to the disc stack so as to accommodate any wear of the discs. The internal secondary drive shaft is connected with an external secondary drive shaft rotatably mounted to the housing opposite the external primary drive shaft. Thus, according to the first preferred embodiment, the external primary drive shaft is drivably coupled with respect to the external secondary drive shaft only when excitation current is provided to the electromagnetic coil assembly.

In a second preferred drive unit embodiment of the present invention, a brake unit utilizes substantially all the clutch structure, except now the second set of annular discs is connected with the drive housing, the external and internal secondary drive shafts being obviated. During excitation, the armature assembly moves with respect to the electromagnetic coil assembly so that the air gap goes to zero thereby allowing the excitation current to be substantially reduced, while armature springs movable with the armature assembly compress biasably with respect to the disc stack so as to accommodate any wear of the discs. Thus, according to the second preferred embodiment, the external primary drive shaft is braked by coupling it with respect to the housing when excitation current is provided to the electromagnetic coil assembly.

In a third preferred drive unit embodiment of the present invention, a combined clutch and brake unit is provided, with the clutch structure being substantially as recounted immediately above. With respect to the brake, the internal primary drive shaft is connected with a first set of annular discs of an oil shear brake disc stack. The housing is connected with a second set of annular discs of the brake disc stack. The brake disc stack is clampably biased by a plurality of brake springs biasing the armature assembly against the brake disc stack, and is released by providing excitation current to the electromagnetic coil assembly. Thus, according to the third preferred embodiment of the present invention, the brake is normally activated, but is released and the clutch activated when excitation current is supplied to the electromagnetic coil assembly.

In fourth, fifth and sixth preferred drive unit embodiments of the present invention, various configurations of clutch/brake units are disclosed by way of example to show the general broadness by which the electrical actuation system according to the present invention may be utilized in drive systems.

Accordingly, it is a primary object of the present invention to provide an electromagnetically actuated system for a drive in which an armature magnetically attracted to an electromagnetic coil provides clamping bias to a disc stack, wherein the air gap between the electromagnetic coil and the armature goes to zero.

It is another object of the present invention to provide an electromagnetically actuated system for a drive in which an armature magnetically attracted to an electromagnetic coil provides clamping bias to a disc stack, wherein the air gap between the electromagnetic coil and the armature goes to zero, and wherein further the electromagnetically actuated system may be used in a clutch, a brake or a combination thereof.

It is yet another object of the present invention to provide an electromagnetically actuated system for a drive in which an armature magnetically attracted to an electromagnetic coil provides clamping bias to a disc stack, wherein the air gap between the electromagnetic coil and the armature goes to zero and thereby permitting the excitation current of the electromagnetic coil to be substantially reduced.

It is an additional object of the present invention to provide an electromagnetically actuated system for a drive in which an armature magnetically attracted to an electromagnetic coil provides clamping bias to a disc stack, wherein the air gap between the electromagnetic coil and the armature goes to zero and yet normal wear of the disc stack is accommodated.

It is a further object of the present invention to provide an electromagnetically actuated system for a drive in which an armature magnetically attracted to an electromagnetic coil provides clamping bias to a disc stack, wherein the air gap between the electromagnetic coil and the armature goes to zero and disc stack wear is accommodated by compression of springs associated with an armature assembly.

These, and additional objects, advantages, features and benefits of the present invention will become apparent from the following specification.

BRIEF DESCRIPTION OF THE DRAWINGS

FIG. 2 is a partly sectional side view of the clutch unit of FIG. 1, now shown with the excitation current switched on.

FIG. 3 is a partly sectional end view of the clutch unit according to the present invention, seen along lines 3—3 in FIG. 1 and showing in particular the preferred form of clutch disc stack.

FIG. 4 is a detail plan view of an annular disc of the clutch disc stack as seen from the vantage as that of FIG. 3.

FIG. 5 is an edge view of the clutch disc stack shown in FIG. 4, seen along lines 5—5 in FIG. 4, in which the clutch disc stack is in a clamped mode.

FIG. 6 is an edge view of the clutch disc stack shown in FIG. 5, now showing the clutch disc stack in an unclamped mode.

FIG. 12 is a partly sectional side view of a second version of a two-speed drive unit according to the present invention having a separate clutch disc stack associated with each of two drive shafts, a brake disc stack and two clutch electromagnetic coils, shown with the excitation current switched off.

FIG. 13 is a schematic diagram of functions of the unit depicted in FIG. 12 with respect to excitation current of the clutch electromagnetic coils.

DETAILED DESCRIPTION OF THE PREFERRED EMBODIMENT

Figure 1:
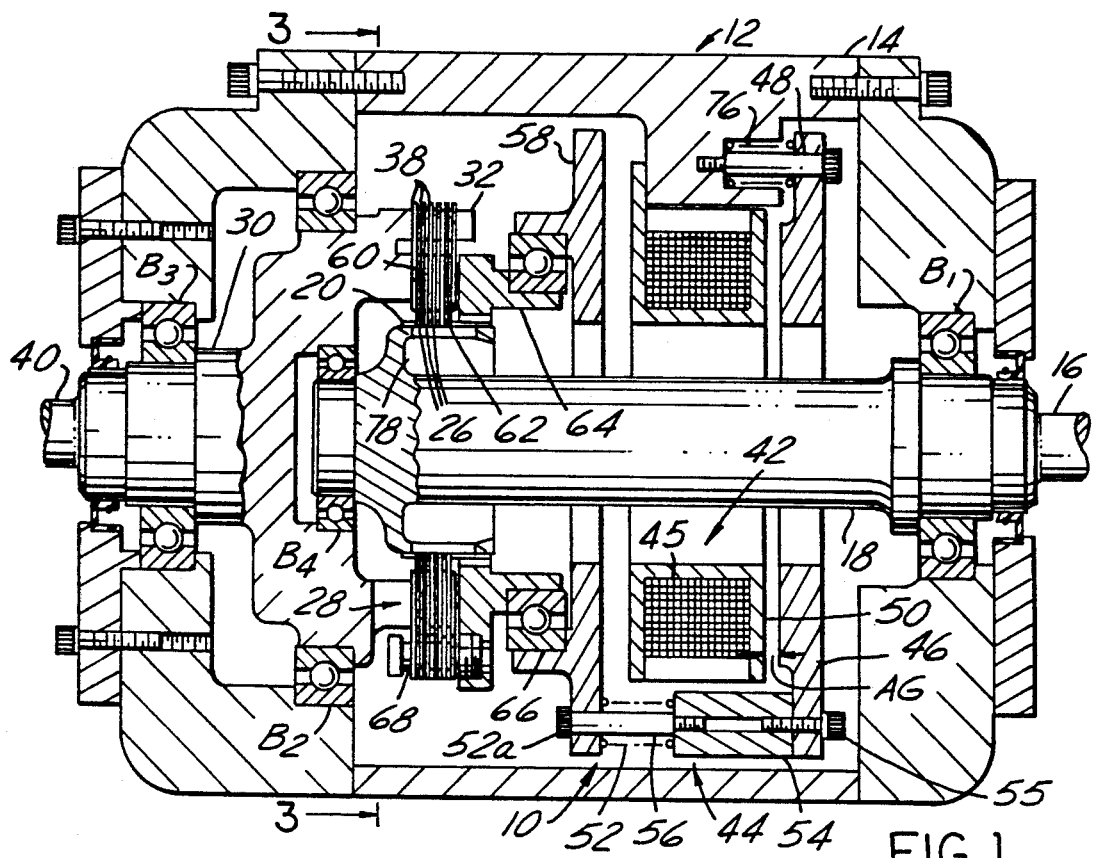
FIG. 1 is a partly sectional side view of a clutch unit according to the present invention, shown with the excitation current switched off.
Figure 2:
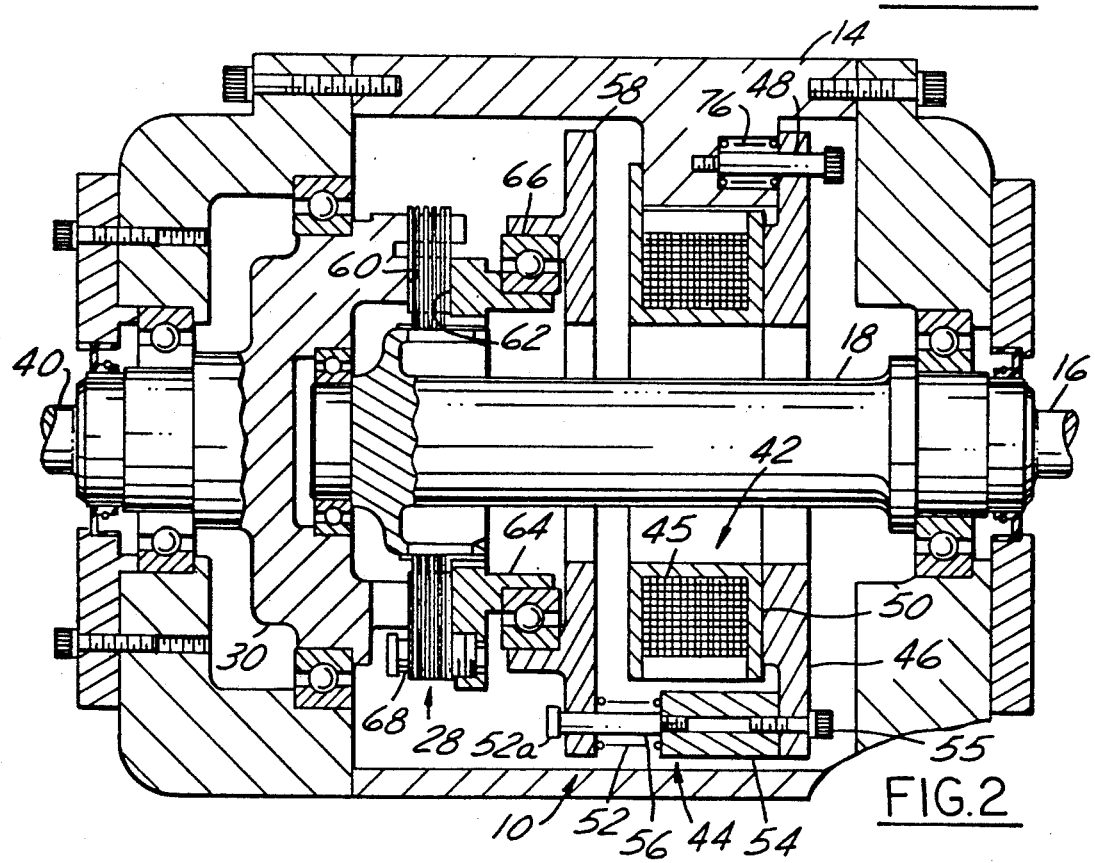

Referring now to the Drawing, a general over-view of the electrical actuation system 10 according to the present invention can be understood with reference being had to FIGS. 1 and 2, which pertains to a clutch unit. In essence, a disc stack has two sets of interleaved annular discs alternately connected with two drive shafts (or other structures of an alternative unit). The two drive shafts are interconnected by the annular discs being clamped by movement of an armature assembly in response to electromagnetic force. Clamping is between a first thrust surface connected with one of the drive shafts abutting a first side of the disc stack and a second thrust surface connected with the armature assembly abutting a second side of the disc stack. An excitation current supplied to an electromagnetic coil causes an armature plate of the armature assembly to be magnetically attracted to the pole piece of the electromagnetic coil and as a result thereof slide on an armature connection structure toward the pole piece until contact therewith has been made. Now, the excitation current is significantly reduced to an amount (about 15% of the original) which provides just sufficient magnetism to keep the armature plate in contact with the pole piece. The movement of the armature plate into contact with the pole piece causes the second thrust surface and one or more armature springs which connect the second thrust surface to the armature plate to move with the armature plate until the second thrust surface forcibly abuts the second side of the disc stack. Since an air gap between the pole piece and the armature plate is wider than a thrust surface gap between the second thrust surface and the disc stack, the one or more armature springs resiliently compress in order to accommodate the length difference between the air gap and the thrust surface gap thereby supplying a biasing force to the second thrust surface with respect to the second side of the disc stack so as to clamp the two sets of annular discs between the first thrust surface and the second thrust surface. Upon the excitation current being switched off, the disc stack is no longer clamped and the two drive shafts are now unconnected. While other units will be disclosed hereinbelow in addition to the clutch unit, this principle of operation generally applies.

A. Clutch unit

FIGS. 1 and 2 show the electrical actuation system 10 operating in a clutch unit 12. A housing 14 rotatably supports, via a bearing $B_1$, an external primary drive shaft 16. Connected to the external primary drive shaft 16 is an internal primary drive shaft 18. The internal primary drive shaft 18 is provided with splines 20 which gearably engage with teeth 22 on the inner periphery 24 of a first set of annular discs 26 of a clutch disc stack 28 (see FIGS. 3 and 4). An internal secondary drive shaft 30 is provided with a plurality of lugs 32 which engage notches 34 on the outer periphery 36 of a second set of annular discs 38 of the clutch disc stack 28 (see FIGS. 3 and 4). The internal secondary drive shaft 30 is rotatably mounted to the housing 14 via a bearing $B_2$ and is connected with an external secondary drive shaft 40 that is rotatably mounted, via a bearing $B_3$, to the housing 14 opposite with respect to the external primary drive shaft 16. One end of the internal primary drive shaft 18 remote from the bearing $B_1$ is rotatably supported via a bearing $B_4$ with respect to the internal secondary drive shaft 30.

When the clutch disc stack 28 is unclamped the two external drive shafts 16, 40 are rotatably independent of one another. Rotative interconnection between the two external drive shafts 16, 40 is achieved by the clutch disc stack 28 being clampably biased due to an excitation current being provided to an electromagnetic coil assembly 42; the clutch disc stack is unclamped by deactivating the excitation current of the electromagnetic coil assembly.

The aforesaid clamping of the clutch disc stack 28 is provided by the electrical actuation system 10, composed of an armature assembly 44 and the electromagnetic coil assembly 42, wherein the armature assembly moves in response to the excitation current being switched on. The armature assembly 44 includes an armature plate 46 which is slidably mounted to and guided by shoulder bolts 48 which are in turn mounted to the housing 14. The armature plate 46 is constructed of a magnetic material so that is caused to slide toward the pole piece 50 of the electromagnetic coil assembly 42 when the excitation current is delivered to the electromagnetic coil 45 of the electromagnetic coil assembly, resulting in the air gap AG between the armature plate and the pole piece going to zero. When the air gap AG is zero, the magnetic circuit is completed, permitting the excitation current to be significantly reduced yet the armature plate continues to remain in contact with the pole piece, as will become clear momentarily. The armature assembly 44 further includes a plurality of armature springs 52 circumferentially spaced on the armature plate 46, and positioned in relation thereto by a spacer 54. Each spacer 54 is connected to the armature plate 46 via an armature bolt 55 that threadably engages with the armature plate. Each spacer 54 has threadably engaged therewith an armature spring bolt 56. The armature spring bolts 56 are circumferentially spaced about and slidably connected with a spring take-up plate 58. Each armature spring 52 is trapped between a respective spacer 54 and the spring take-up plate 58, wherein the spring take-up plate is slidably regulated by the heads 56a of the armature spring bolts 56. Accordingly, the armature springs 52 provides a predetermined spring tension between the armature plate 46 and the spring take-up plate 58.

The clutch disc stack 28 is located between a first thrust surface 60 connected with the internal secondary drive shaft 30 and a second thrust surface 62 located on a thrust plate 64. The thrust plate 64 is rotatable with the discs of the clutch disc stack 28 via a thrust bearing 66 which is, in turn, connected to the spring take-up plate 58.

In operation, normally the discs 26, 38 of the clutch disc stack 28 are unclamped in that a thrust surface gap on the order of 0.03 inch is provided between the second thrust surface 62 and its respectively adjacent annular disc of the clutch disc stack. Accordingly, the two external drive shafts 16, 40 are rotatively independent, as is shown in FIG. 1. When an excitation current is supplied to the electromagnetic coil 45, as is shown in FIG. 2, the armature plate 46 is magnetically attracted thereto and moves toward the pole piece 50 until the air gap AG therebetween becomes zero. During this movement, the first and second thrust surfaces 60, 62 clamp the clutch disc stack 28 between them as the thrust plate 64 is caused to bias against the clutch disc stack due to its mechanical linkage to the armature plate 46. That is, the armature plate 46 pushes the spacers 54, armature springs 52, spring take-up plate 58, thrust bearing 66 and thrust plate 64 toward the clutch disc stack 28. These components will continue to move in concert until the thrust plate 64 makes contact with the clutch disc stack 28. When contact is made, the thrust plate 64, thrust bearing 66 and spring take-up plate 58 are abutably stopped by the clutch disc stack 28, yet the armature plate 46 and spacers 54 continue to move until the armature plate contacts the pole piece 50. The difference in axial movement between the armature plate 46 and the spring take-up plate 58, defined by the difference in length between the air gap AG and the thrust surface gap, the air gap length exceeding the thrust surface gap length, effects to compress the armature springs 52. Compression of the armature springs, in turn, effects exertion of clamping force on the clutch disc stack 28 between the first and second thrust surfaces 60, 62. Now, since the annular disc sets 26, 38 of the clutch disc stack 28 will experience wear over their operational lifetime, the amount of compression of the armature springs 52 will vary over time, too. However, always the clutch disc stack will be clamped by the compressive force supplied by the armature springs. Since the air gap AG goes to zero, the excitation current can be significantly reduced, on the order of 15% of the original value, and still sufficient attractive magnetic force will be provided to keep the armature plate 46 in contact with the pole piece 50. As a result, Joule heating effects are greatly minimized even though the excitation current is continuously supplied.

When the excitation current is switched off, clamping of the clutch disc stack 28 ceases. The thrust surface gap between the second thrust surface 62 of the thrust plate 64 and the clutch disc stack is preferably established by provision of a thrust spring 76 at each of the shoulder bolts 48 so as to urge the armature plate 46 axially away from the clutch disc stack 28 when the excitation current is off.

Since a predetermined amount of spring tension is provided by the armature springs 52 when the armature plate 46 is in contact with the pole piece 50, as the discs 26, 38 wear the spring tension of the armature springs 52 remains effective to supply proper clamping force against the clutch disc stack 28. Accordingly, the major problem in the prior art of how to solve the problem of how a fixed armature movement that provides a zero air gap can also accommodate disc wear has been solved by the placement of the armature springs 52 between the thrust plate 64 and the armature plate 46. Torque transfer between the two sets of annular discs 26, 38 can be varied per particular application of the clutch unit 12 by providing armature springs 52 having a certain preselected spring constant, and/or varying the air gap AG.

Other forms of armature springs can be substituted for that depicted in the Drawing. For instance, an armature spring in the structure of a wave washer trapped on the armature spring bolts 56 may be used to supply spring tension in the manner herein disclosed with respect to the plurality of armature springs 52.

It is preferred that the clutch disc stack 28 be of an improved construction disclosed in the aforesaid co-pending application Ser. No. 07/846,546. In this regard, the following details are of note, with reference being directed to FIGS. 3 through 6.

The clutch disc stack 28 is pre-assembled using a plurality of axially projecting and circumferentially spaced alignment pins 68. In this regard, the second set of annular discs 36 is provided with a plurality of holes 70 through which the alignment pins 68 pass. The annular discs of each set 26, 38 are alternately stacked. A wave washer 72 is preferred, but not required, to be placed between each of the annular discs of the second set 36. Upon completion of this stacking process, a double threaded nut 74 is threaded onto an end of each of the alignment pins 68 opposite the head 68a thereof; it is preferred for a thread lock adhesive to be used to assure that the double threaded nuts 74 remain permanently threaded at a desired location on the alignment pins 68. Accordingly, both sets of annular discs 26, 38 are trapped between a head 68a at one end of each of the alignment pins 68 and the double threaded nut 74 at the other end of each of the alignment pins. The clutch disc stack 28 is structured to engage the internal primary and internal secondary drive shafts 18, 30 in the manner aforesaid so that the first and second sets of annular discs 26, 38 are respectively axially slidable therewith. The double threaded nuts 74 threadably engage with the thrust plate 64. The preferred clutch disc stack 28 has a number of significant advantages over the prior art, as are discussed in the aforesaid application.

Oil is filled within the housing 14 via a removable threaded filler/sight cap (not shown), and an oil sight is provided (not shown) for determining the oil level. In order to ensure proper oil flow between the annular discs of the clutch disc stack 28, a centrifugal oil pump 78 is provided on the internal primary drive shaft 18 adjacent the splines 20. A breather (not shown) is provided for keeping atmospheric pressure within the clutch unit 12; excessive pressure can lead to oil seal failure, and therefore is to be avoided. Oil is circulated around the electromagnetic coil assembly 42 to assist heat dissipation. Due to the use of oil, throughout the clutch unit 12, oil seals and gaskets between housing components are utilized to prevent oil leaks.

Further, the clutch disc stack 28 may be configured differently, such as by two or more annular discs being differently ordered; that is, two or more annular discs of the same set being mutually adjacent.

The essential features of the electrical actuation system 10 have now been described with respect to a clutch unit 12; its application in a whole host of other devices shall be exemplified by the following description of other units, wherein the description will be made as briefly as possible in view of the applicability of the detailed discussion recounted hereinabove, and wherein further substantially identical parts have the same names and numeral designations, and wherein still further, modified or added analogous parts are designated using the same numeral but with a distinguishing lower case letter.

B. Brake Unit

Figure 1A:
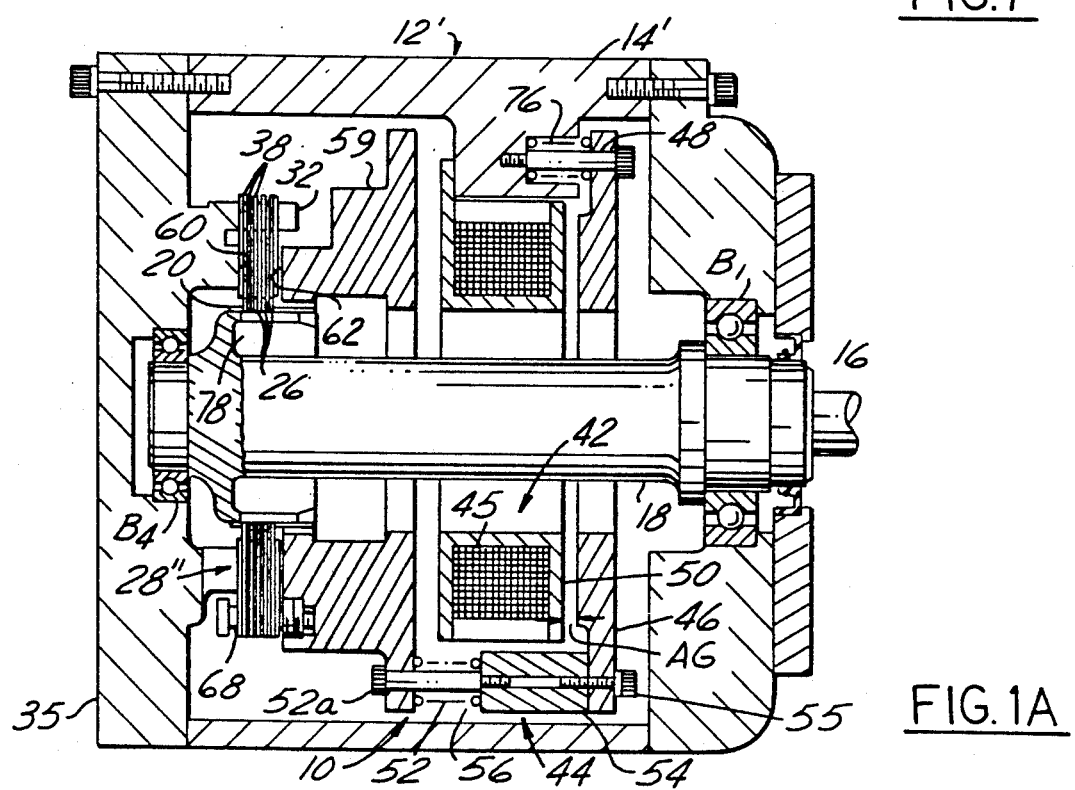
FIG. 1A is a partly sectional side view of a brake unit according to the present invention, shown with the excitation current switched off.

FIG. 1A shows a brake unit 12' structured from the clutch unit 12 and utilizing the electrical actuation system 10 as recounted hereinabove. The clutch disc stack 28 now serves as a brake disc stack 28". The brake unit 12' has no internal or external secondary drive shaft, but rather has a rear plate 35 which integrally carries the circumferentially placed lugs 32 which interface with the notches (as shown in FIGS. 3 and 4) on the second set of annular discs 38. The splines 20 on the internal primary drive shaft 18 interface with the teeth (as shown in FIGS. 3 and 4) on the first set of annular discs 26. Connection between the sets of annular discs 26, 38 permits axial movement respectively with regard to the splines 20 and the lugs 32. The rear plate 35 includes a first thrust surface 60 adjacent the brake disc stack 28", and a modified spring take-up plate 59 is provided with a second thrust surface 62 adjacent the brake disc stack 28" opposite the first thrust surface. The thrust bearing 66 and the thrust plate 64 of the clutch unit 12 are obviated. The annular discs adjacent the first and second thrust surfaces 60, 62 are of the second set of annular discs 38.

In operation, when excitation current is off, the external primary drive shaft 16 is not braked, as the brake disc stack 28 is not clamped. An excitation current supplied to the electromagnetic coil 45 causes the armature plate 46 to be magnetically attracted to the pole piece 50 and as a result thereof slide on the shoulder bolts 48 toward the pole piece until contact therewith has been made whereupon the excitation current is reduced to a low value which provides just sufficient magnetism to keep the armature plate in contact with the pole piece. Movement of the armature plate 46 into contact with the pole piece 50 causes the armature springs 52 and the modified spring take-up plate 59 to move with the armature plate until the second thrust surface 62 forcibly abuts the second side of the brake disc stack 28". Since the air gap AG is longer than the thrust surface gap (between the brake disc stack and the second thrust surface), the armature springs 52 resiliently compress in order to accommodate the length difference between the air gap and the thrust surface gap thereby supplying biasing force to the second thrust surface with respect to the second side of the brake disc stack so as to clamp the first and second sets of annular discs 26, 38 between the first thrust surface 60 and the second thrust surface 62 to thereby brake the external primary drive shaft 16 with respect to the housing 14'.

C. Single Coil Clutch/Brake Unit

Figure 7:
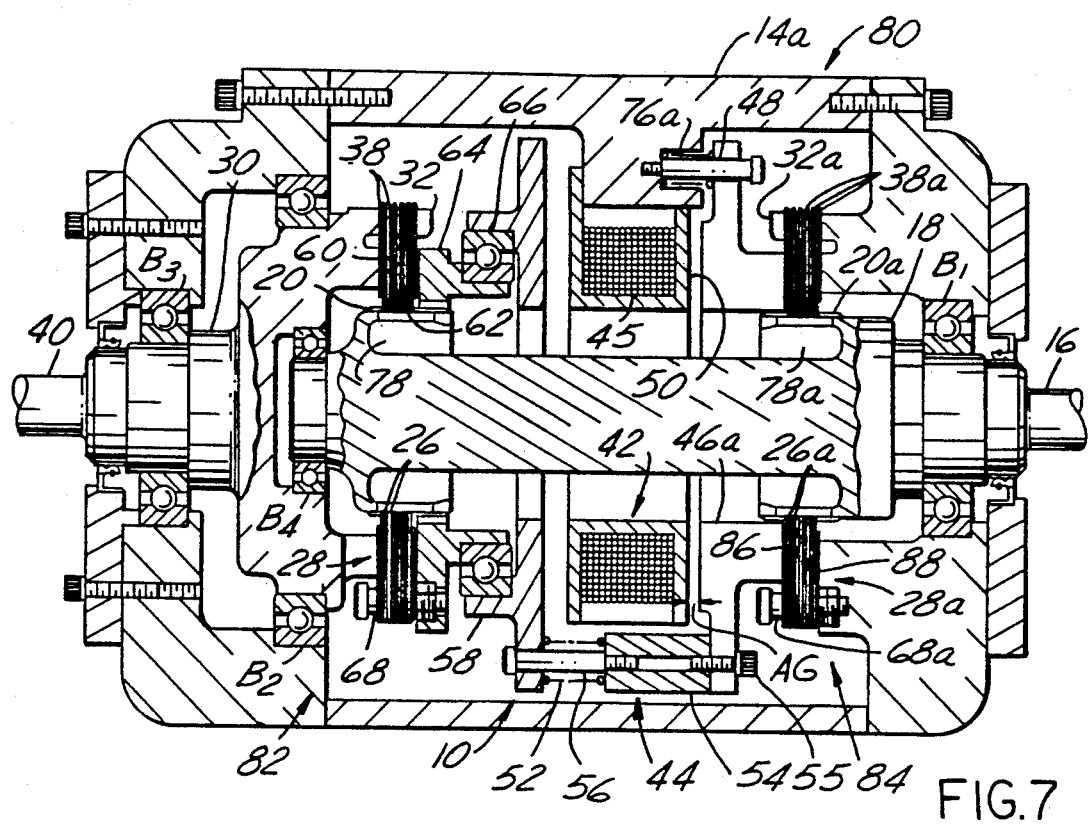
FIG. 7 is a partly sectional side view of a clutch/brake unit according to the present invention, shown with the excitation current switched off.

FIG. 7 shows a clutch/brake unit 80 incorporating a clutch section 82 having the electrical actuation system 10 as recounted hereinabove with respect to the clutch unit 12, and a brake section 84 having a brake disc stack 28a which has the structural features recounted hereinabove with respect to the clutch disc stack 28. The brake section 84 includes circumferentially placed lugs 32a connected with the housing 14a which interface with the notches (as shown in FIGS. 3 and 4) on the second set of annular discs 38a. The brake section further includes splines 20a on the internal primary drive shaft which interface with the teeth (as shown in FIGS. 3 and 4) on the first set of annular discs 26a. Connection between the sets of annular discs 26a, 38a permits axial movement respectively with regard to the splines 20a and the lugs 32a. The armature plate 46a is provided with a first brake thrust surface 86 adjacent the brake disc stack 28a, and the housing 14a is provided with a second brake thrust surface 88 adjacent the brake disc stack 28a opposite the first brake thrust surface. The shoulder bolts 48 are now provided with brake springs 76a which supply a predetermined biasing force on the armature plate 46a toward the brake disc stack 28a so that the brake disc stack is clamped when the excitation current is off.

In operation, the brake springs 76a bias the armature plate 46a so that the first brake thrust surface 86 forces against one side of the brake disc stack 28a causing the first and second annular discs 26a, 38a of the brake disc stack to be clamped between the first and second brake thrust surfaces 86, 88 thereby braking the external primary drive shaft 16 with respect to the housing 14a. An excitation current supplied to the electromagnetic coil 45 causes the armature plate 46a to be magnetically attracted to the pole piece 50 and as a result thereof slide on the shoulder bolts 48 toward the pole piece until contact therewith has been made whereupon the excitation current is reduced to a low value which provides just sufficient magnetism to keep the armature plate in contact with the pole piece. Movement of the armature plate 46a into contact with the pole piece 50 causes the armature springs 52, the spring take-up plate 58, the thrust plate 64 and the thrust bearing 66 to move with the armature plate until the second clutch thrust surface 62 forcibly abuts one side of the clutch disc stack. Since the air gap AG is longer than the thrust surface gap (between the second clutch thrust surface 62 and the clutch disc stack 28), the armature springs 52 resiliently compress in order to accommodate the difference between the air gap and the thrust surface gap thereby supplying a biasing force to the second clutch thrust surface 62 with respect to one side of the clutch disc stack 28 so as to clamp the first and second sets of annular discs 28, 38 of the clutch disc stack between the first and second clutch thrust surfaces 60, 62 to thereby interconnect the external primary drive shaft 16 with the external secondary drive shaft 40, while attendently the movement of the armature plate 46a into contact with the pole piece 50 effects to release the external primary drive shaft 16 from being braked with respect to the housing 14a. When the excitation current is switched off, the armature plate 46a is urged by the brake springs 76a again into a clamping relationship with the brake disc stack 28a, and the external primary and secondary drive shafts 16, 40 are again rotatively independent. This configuration allows for momentary toggling between the actuation of the brake disc stack and the clutch disc stack in order to achieve a desired level of precise rotative movements of the external primary and secondary drive shafts.

D. Dual Coil Clutch/Brake Unit

Figures 8, 9:
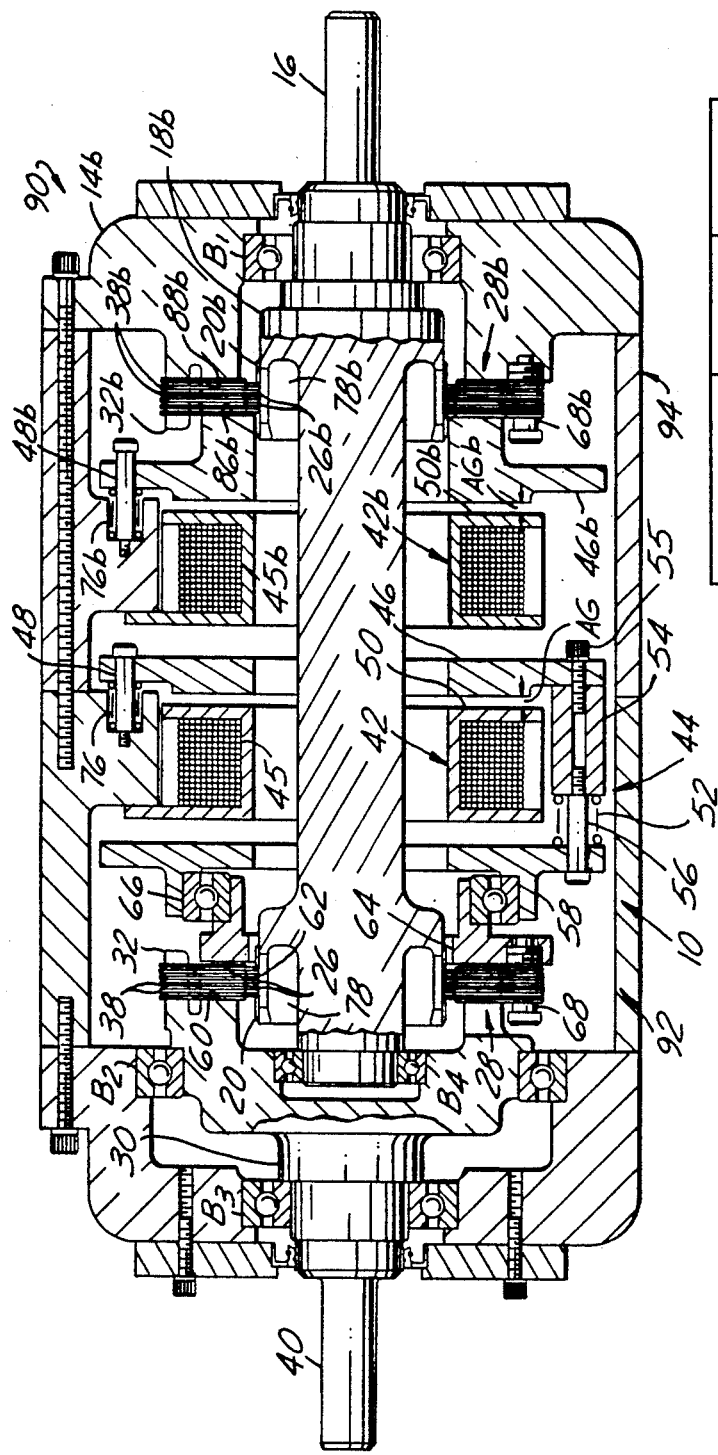
FIG. 8 is a partly sectional side view of a clutch/brake unit according to the present invention with two separate electromagnetic coils, shown with the excitation current switched off.
FIG. 9 is a schematic diagram of functions of the unit depicted in FIG. 8 with respect to excitation current of the clutch and brake electromagnetic coils.

Referring now to FIGS. 8 and 9, a dual coil clutch/brake unit 90 is depicted. The clutch section 92 is structured and operates as disclosed hereinabove with respect to the clutch unit 12. The brake section 94 operates independently of the clutch section 92. In this regard, the brake section is structured substantially as recounted hereinabove with respect to the clutch/brake unit 80, except that a separate brake electromagnetic coil assembly 42b actuates a separate brake armature 46b which is ordinarily biased toward the brake disc stack 28b via a plurality of brake shoulder bolts 48b which carry brake springs 76b.

In operation, when no excitation current is delivered to either of the electromagnetic coils 45, 45b, the brake disc stack 28b is clamped and the clutch disc stack 28 is unclamped. This is because the brake armature springs 76b bias the brake armature plate 46b so that the first brake thrust surface 86b forces against the second side of the brake disc stack 28b causing the first and second sets of annular discs 26b, 38b of the brake disc stack to be clamped between the first and second brake thrust surfaces 86b, 88b thereby braking the external primary drive shaft 16 with respect to the housing 14b. Now, a first excitation current supplied to the brake electromagnetic coil 45b (coil #2 in FIG. 9) causes the brake armature plate 46b to be magnetically attracted to the brake pole piece 50b and as a result thereof slide on the brake shoulder bolts 48b toward the brake pole piece until contact therewith has been made. At this point, the first excitation current is reduced to an amount which just provides sufficient magnetism to keep the brake armature plate in contact with the brake pole piece.

Now, a second excitation current supplied to the clutch electromagnetic coil 45 (coil #1 in FIG. 9) causes the clutch armature plate 46 to be magnetically attracted to the clutch pole piece 50 and as a result thereof slide on the clutch shoulder bolts 48 into contact with the clutch pole piece 50 until contact therewith has been made. At this point, the second excitation current is reduced to an amount which provides just sufficient magnetism to keep the clutch armature plate 46 in contact with the clutch pole piece 50. Movement of the clutch armature plate 46 into contact with the clutch pole piece 50 causes the armature springs 52, the spring take-up plate 58, the thrust plate 64 and the thrust bearing 66 to move with the clutch armature plate until the second clutch thrust surface 62 forcibly abuts the second side of the clutch disc stack 28. Since the length of the air gap AG is greater than that of the clutch thrust surface gap between the second clutch thrust surface 62 and the clutch disc stack 28, the armature springs 52 resiliently compress in order to accommodate the length difference between the air gap and the clutch thrust surface gap thereby supplying biasing force to the second clutch thrust surface 62 with respect to the second side of the clutch disc stack 28 so as to clamp the first and second sets of annular discs 26, 38 of the clutch disc stack between the first clutch thrust surface 60 and the second clutch thrust surface 62 to thereby interconnect the external primary drive shaft 16 with the external secondary drive shaft 40. Optionally, should it be desired to brake the external secondary drive shaft 40, excitation current to the clutch electromagnetic coil 45 would be maintained, while excitation current to the brake electromagnetic coil 45b would be switched off.

E. Two-Speed Drive Unit, first version

Figures 10, 11:
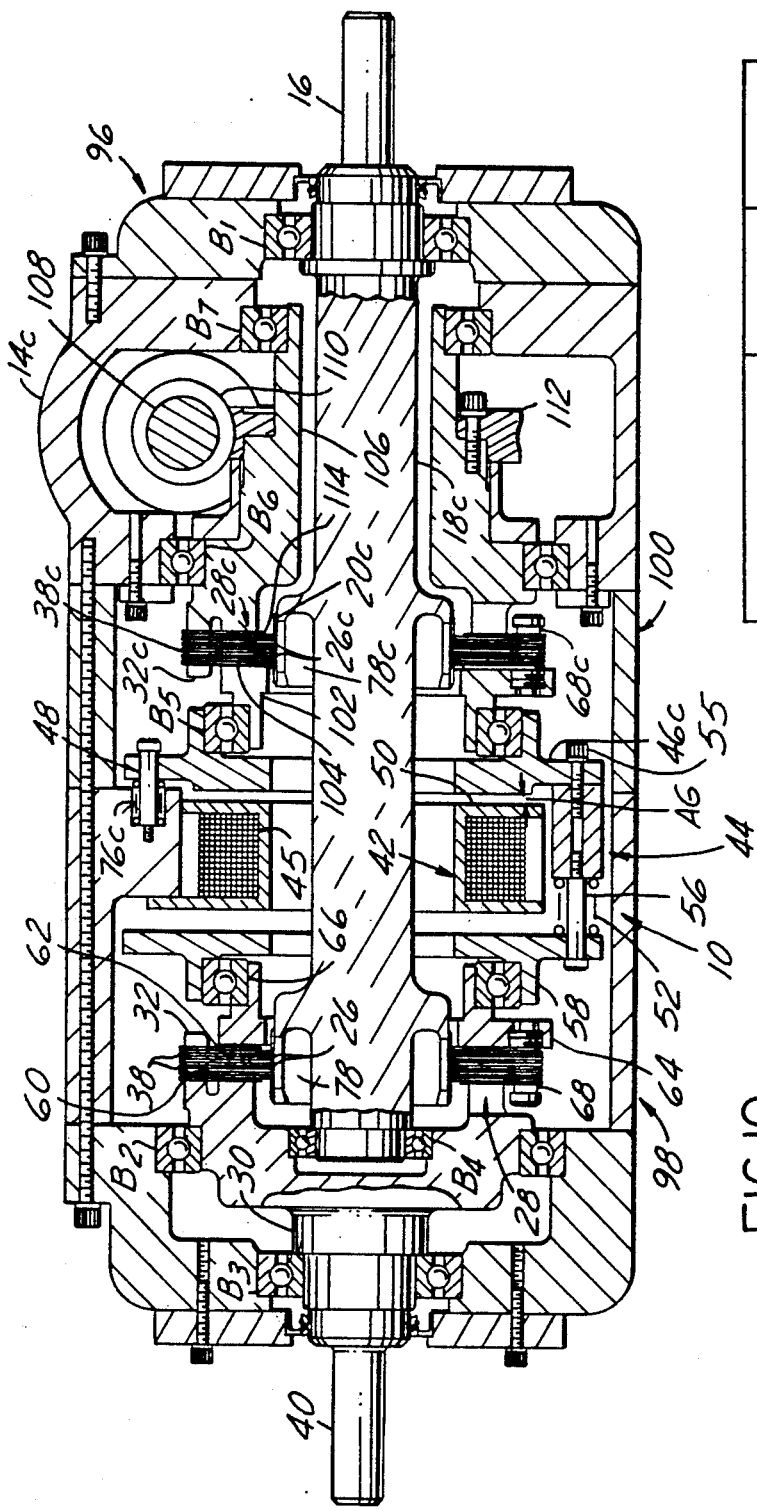
FIG. 10 is a partly sectional side view of a first version of a two-speed drive unit according to the present invention having a separate clutch disc stack associated with each of two drive shafts, one clutch electromagnetic coil and one brake electromagnetic coil (not shown), shown with the excitation current switched off.
FIG. 11 is a schematic diagram of functions of the unit depicted in FIG. 10 with respect to excitation current of the clutch and brake electromagnetic coils.

FIGS. 10 and 11 depict a two-speed drive unit 96, having a primary clutch section 98, and a secondary clutch section 100. The primary clutch section 98 is structured as disclosed hereinabove with respect to the clutch/brake unit 80. The secondary clutch section 100 includes the structure recounted hereinabove with respect to the clutch/brake unit 80, and further includes the following components. The armature plate 46c is structured to carry a bearing B$_5$ which is in turn connected with a secondary thrust plate 102. The secondary thrust plate 102 includes a first secondary clutch thrust surface 104 which is located adjacent a secondary clutch disc stack 28c. The first set of annular discs 26c of the secondary clutch disc stack 28c is provided with teeth (per FIGS. 3 and 4) which engage splines 20c on the internal primary drive shaft 18c. The second set of annular discs 38c have notches (per FIGS. 3 and 4) which engage lugs 32c. The lugs 32c are provided on a primary internal tertiary drive shaft 106. The primary internal tertiary drive shaft 106 is supported with respect to the housing 14c by bearings B$_6$ and B$_7$. The primary internal tertiary drive shaft 106 is connected gearably with a secondary internal tertiary drive shaft 108, preferably using a worm 110 and worm gear 112 interconnection well known in the art. The secondary internal tertiary drive shaft 108 is connected with a brake section preferably similar to the brake section 94 depicted in FIG. 8. In this regard, the depicted primary external and internal drive shafts 16, 18b analogously serve as the secondary internal tertiary drive shaft 108, the depicted electromagnetic coil 42b analogously serves as the brake electromagnetic coil of the brake section, and the depicted armature plate 46b analogously serves as the brake armature plate of the brake section. The primary internal tertiary drive shaft 106 includes a second secondary clutch thrust surface 114 adjacent the secondary clutch disc stack 28c opposite the first secondary clutch thrust surface 104.

In operation, when excitation current to the electromagnetic coil assembly 42 (depicted in FIG. 10, coil #1 in FIG. 11) and excitation current to the brake electromagnetic coil assembly (depicted in FIG. 8, coil #2 in FIG. 11) is off, the secondary clutch springs 76c bias the armature plate 46c toward the secondary clutch disc stack 28c, thereby clamping the first and second annular discs 26c, 38c of the secondary clutch disc stack between the first and second secondary clutch thrust surfaces 104, 114. Accordingly, the secondary internal tertiary drive shaft 108 is mechanically connected with the external primary drive shaft 16, thereby providing a first speed mode. In this mode, the external secondary drive shaft 40 would be rotatively independent of both the external primary drive shaft 16 and the secondary internal tertiary drive shaft 108.

The brake section function will now be detailed with reference being had to the analogous structure depicted in FIG. 8. The brake springs 76b bias the brake armature plate 46b so that the brake thrust surface 86b forces against the second side of the brake disc stack causing the first and second annular plates 26b, 38b of the brake disc stack to be clamped between the first and second brake thrust surfaces 86b, 88b thereby braking the secondary internal tertiary drive shaft with respect to the housing. Now, a first excitation current supplied to the brake electromagnetic coil 45b causes the brake armature plate 46b to be magnetically attracted to the brake pole piece 50b and as a result thereof slide on the brake shoulder bolts toward the brake pole piece until contact therewith has been made. At this point, the first excitation current is reduced to an amount which provides just sufficient magnetism to keep the brake armature plate 46b in contact with the brake pole piece 50b. Movement of the brake armature 46b into contact with the brake pole piece 50b releases the secondary internal tertiary drive shaft from being braked with respect to the housing.

Referring again to FIGS. 10 and 11, placement of the two-speed drive unit 96 into a second speed mode will be detailed. A second excitation current is supplied to the clutch electromagnetic coil 45 to cause the clutch armature plate 46c to be magnetically attracted to the clutch pole piece 50 and as a result thereof slide on the clutch shoulder bolts 48 toward the clutch pole piece until contact therewith has been made. Now, the second excitation current is reduced to an amount which provides just sufficient magnetism to keep the clutch armature plate 46c in contact with the clutch pole piece 50. Movement of the armature plate 46c into contact with the clutch pole piece 50 causes the armature springs 52, the spring take-up plate 58, the thrust plate 64 and the thrust bearing 66 to move with the clutch armature plate until the second clutch thrust surface 62 forcibly abuts the second side of the primary clutch disc stack 28. Since the air gap AG is greater that the clutch thrust surface gap between the second clutch thrust surface 62 and the primary clutch disc stack 28, the armature springs resiliently compress in order to accommodate the length difference between the air gap and the clutch thrust surface gap thereby supplying biasing force to the second clutch thrust surface 62 with respect to the second side of the primary clutch disc stack 28 so as to clamp the first and second sets of annular discs 26, 38 between the first clutch thrust surface 60 and the second clutch thrust surface 62 to thereby interconnect the external primary drive shaft 16 with the external secondary drive shaft 40.

F. Two-Speed Drive Unit, second version

Referring now to FIGS. 12 and 13, another two-speed drive unit 116 is shown. In this variation, two clutch sections 118 and 120 are provided, each having the structure as discussed hereinabove with respect to the clutch/brake unit 80; a brake section 122 is also provided between the two clutch sections. In this regard, each of the armature plates 46d and 46d' are provided respectively with first and second brake thrust surfaces 124, 126 between which the brake disc stack 28d is clampable. The first clutch disc stack 28 is clampable in the manner indicated hereinabove relative to the clutch/brake unit 80, via the electrical actuation unit 10, so as to control mechanical linkage of the external secondary drive shaft 40 with respect to the external primary drive shaft 16. The second clutch disc stack 28' is clampable in the manner indicated hereinabove relative to the clutch/brake unit 80, via the electrical actuation unit 10', so as to control mechanical linkage of primary and secondary internal tertiary drive shafts 106d, 108d, of the type discussed hereinabove (without a brake section), with respect to the external primary drive shaft 16.

In operation, when excitation current to the first electromagnetic coil 45 (coil #1 in FIG. 13) is off and excitation current to the second electromagnetic coil 45' (coil #2 in FIG. 13) is also off, the first clutch springs 76 bias the first brake thrust surface 124 of the first armature plate 46 toward the brake disc stack 28d and the second clutch springs 76' bias the second brake thrust surface 1264 of the second armature plate 46d' toward the brake clutch disc stack 28d, thereby clamping the first and second annular discs 26d, 38d of the brake disc stack between the first and second brake thrust surfaces 124, 126. Accordingly, the external primary drive shaft 16 is braked with respect to the housing 14d.

In order to place the two-speed drive 116 into a first speed mode, a first excitation current is supplied to the first electromagnetic coil 45, the first armature plate 46 is magnetically attracted to the first pole piece 50 and as a result thereof slides on the first shoulder bolts 48 toward the first pole piece until contact therewith has been made. Now, the first excitation current is reduced to an amount which provides just sufficient magnetism to keep the first armature plate 46 in contact with the first pole piece 50. Movement of the first armature plate 46 into contact with the first pole piece 50 causes the first armature springs 52, the first spring take-up plate 58, the first thrust plate 64 and the first thrust bearing 66 to move with the first armature plate until the fourth thrust surface 62 thereon forcibly abuts the second side of the first disc stack 28. Since the length of the air gap AG is greater than that of the first thrust surface gap between the fourth thrust surface 62 and the first disc stack 28, the first armature springs 52 resiliently compress in order to accommodate the length difference between the air gap and the first thrust surface gap thereby supplying biasing force to the fourth thrust surface with respect to the second side of the first disc stack so as to clamp the first and second sets of annular discs 26, 38 of the first disc stack 28 between the first thrust surface 60 and the fourth thrust surface 62 to thereby interconnect the external primary drive shaft 16 with the external secondary drive shaft 40.

In order to place the two-speed drive 116 into a second speed mode, a second excitation current is supplied to the second electromagnetic coil 45' to cause the second armature plate 46' to be magnetically attracted to the second pole piece 50' and as a result thereof slide on the second shoulder bolts 48' toward the second pole piece until contact therewith has been made. Now, the second excitation current is reduced to an amount which provides just sufficient magnetism to keep the second armature plate 46' in contact with the second pole piece 50'. Movement of the second armature plate 46' into contact with the second pole piece 50' causes the second armature springs 52', the second spring take-up plate 58', the second thrust plate 64' and the second thrust bearing 66' to move with the second armature plate until the sixth thrust surface 62' thereon forcibly abuts the second side of the second disc stack 28'. Since the length of the air gap AG' is greater than that of the second thrust surface gap between the sixth thrust surface 62' and the second disc stack 28', the second armature springs 52' resiliently compress in order to accommodate the length difference between the air gap and the second thrust surface gap thereby supplying biasing force to the sixth thrust surface with respect to the second side of the second disc stack so as to clamp the first and second sets of annular discs 26' 38' of the second disc stack 28' between the fifth thrust surface 60' and the sixth thrust surface 62' to thereby interconnect the external primary drive shaft 16 with the secondary internal tertiary drive shaft 108d.

To those skilled in the art to which this invention appertains, the above described preferred embodiment may be subject to change or modification. For instance, while oil shear operated clutch and brake stacks are preferred, certain installations may be better served by substituting dry friction disc stacks for these components. In such a case, the Drawing remains effective to fully show this structure, although components to supply and move oil would be dispensed with. Also, a disc stack used with the electrical actuation system 10 could have more than two sets of annular discs. Such change or modification can be carried out without departing from the scope of the invention, which is intended to be limited only by the scope of the appended claims.

What is claimed is:

1. An electrical actuation system for a drive, the drive having a housing, the drive further having at least one disc stack mounted within the housing, the disc stack having a first side and a second side, a first thrust surface being provided within the housing adjacent the first side of the disc stack, the disc stack being composed of at least two sets of annular discs which are mutually interleaved, said electrical actuation system comprising:

an electromagnetic coil assembly located within and connected to the housing, said electromagnetic coil assembly comprising an electromagnetic coil and a pole piece, said pole piece being located with respect to said electromagnetic coil so as to be magnetizable thereby; and an armature assembly located within the housing, said armature assembly comprising:
armature plate means selectively locatable within a first predetermined distance from said pole piece;

armature connection means for slidably connecting said armature plate means with respect to the housing so that said armature plate means may slide reciprocably between a first location whereat said armature plate means contacts said pole piece to a second location whereat said armature plate means is at said first predetermined distance from said pole piece;

spring take-up plate means resiliently connected with said armature plate means;

armature spring means for resiliently connecting said spring take-up plate means to said armature plate means, said armature spring means having a first end and a second end, said first end of said armature spring means being connected with said armature plate means, said second end of said armature spring means being slidably connected with said spring take-up plate means; and second thrust surface means for selectively contacting the second side of the disc stack, said second thrust surface means being connected with said spring take-up plate means, said second thrust surface means being selectively locatable within a second predetermined distance from the second side of the disc stack;

wherein an excitation current supplied to said electromagnetic coil causes said armature plate means to be magnetically attracted to said pole piece and as a result thereof slide on said armature connection means toward said pole piece until contact therewith has been made whereupon said excitation current is reduced by a predetermined amount which provides sufficient magnetism to keep said armature plate means in contact with said pole piece, and wherein said first predetermined distance is longer than said second predetermined distance; wherein further, the movement of said armature plate means into contact with said pole piece causes said armature spring means, said spring take-up plate means and said second thrust surface means to move with said armature plate means until said second thrust surface means forcibly abuts the second side of the disc stack, wherein still further, said armature spring means resiliently compresses in order to accommodate the difference between said first and second predetermined distances thereby supplying a predetermined biasing force to said second thrust surface means with respect to the second side of the disc stack so as to clamp the at least two sets of annular discs between the first thrust surface and said second thrust surface means.

2. The electrical actuation system of claim 1, wherein said armature connection means further comprises means for biasing said armature plate means away from said pole piece when no excitation current is supplied to said electromagnetic coil.

3. The electrical actuation system of claim 1, wherein said armature spring means comprises:

a plurality of armature spring bolts, each armature spring bolt having a first end and an opposite second end having a head, said spring take-up plate means being slidably connected with said plurality of armature spring bolts;

a plurality of spacers connected with said armature plate means, a respective spacer of said plurality of spacers being connected with each armature bolt at said first end thereof;

a plurality of armature springs, a respective armature spring of said plurality of armature springs being located on each armature bolt, said spring take-up plate being trapped on said plurality of armature bolts between said head thereof and said respective armature spring.

4. The electrical actuation system of claim 1, wherein said second thrust surface means comprises:

thrust plate means having a second thrust surface for selectively contacting the second side of the disc stack, said second thrust surface being selectively locatable within the second predetermined distance from the second side of the disc stack; and bearing means for connecting said spring take-up plate means to said thrust plate means and for permitting mutual rotation therebetween.

5. The electrical actuation system of claim 4, wherein said armature spring means comprises:

a plurality of armature spring bolts, each armature spring bolt having a first end and an opposite second end having a head, said spring take-up plate means being slidably connected with said plurality of armature spring bolts;

a plurality of spacers connected with said armature plate means, a respective spacer of said plurality of spacers being connected with each armature bolt at said first end thereof; and a plurality of armature springs, a respective armature spring of said plurality of armature springs being located on each armature bolt, said spring take-up plate being trapped on said plurality of armature bolts between said head thereof and said respective armature spring.

6. The electrical actuation system of claim 5, wherein said armature connection means further comprises means for biasing said armature plate means away from said pole piece when no excitation current is supplied to said electromagnetic coil.

7. The electrical actuation system of claim 1, wherein the disc stack comprises:

a first set of annular discs, said first set of annular discs being structured to connect selectively with respect to the drive;

a second set of annular discs, said second set of annular discs being structured to connect selectively with respect to the drive, said first set of annular discs being interleaved with said second set of annular discs; and alignment pin means connected with said second set of annular discs for capturing each annular disc of said second set of annular discs and for capturing each annular disc of said first set of annular discs.

8. The electrical actuation system for a drive of claim 7, wherein said alignment pin means comprises:

a plurality of alignment pins, each alignment pin of said plurality of alignment pins having an alignment pin head at a first end thereof and a threaded opposite end;

a plurality of nuts, a nut of said plurality of nuts being threadably engaged on said threaded opposite end of each said alignment pin; and a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;

wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

9. A clutch unit comprising:

a housing;

first drive shaft means rotatably connected with said housing;

second drive shaft means rotatably connected with said housing;

disc stack means having a first side and a second side, said disc stack means comprising:
  a first set of annular discs connected with said first drive shaft means so as to be rotatable therewith and axially slidable with respect thereto; and
  a second set of annular discs connected with said second drive shaft means so as to be rotatable therewith and axially slidable with respect thereto, said first set of annular discs being interleaved with said second set of annular discs;

first thrust surface means connected with said second drive shaft means adjacent said first side of said disc stack means;

an electromagnetic coil assembly located within and connected to said housing, said electromagnetic coil assembly comprising an electromagnetic coil and a pole piece, said pole piece being located with respect to said electromagnetic coil so as to be magnetizable thereby; and an armature assembly located within said housing, said armature assembly comprising:
  armature plate means selectively locatable within a first predetermined distance from said pole piece;
  armature connection means for slidably connecting said armature plate means with respect to said housing so that said armature plate means may slide reciprocably between a first location whereat said armature plate means contacts said pole piece to a second location whereat said armature plate means is at said first predetermined distance from said pole piece;
  spring take-up plate means resiliently connected with said armature plate means;
  armature spring means for resiliently connecting said spring take-up plate means to said armature plate means, said armature spring means having a first end and a second end, said first end of said armature spring means being connected with said armature plate means, said second end of said armature spring means being slidably connected with said spring take-up plate means;
  thrust plate means having second thrust surface means for selectively contacting the second side of the disc stack, said second thrust surface means being selectively locatable within a second predetermined distance from the second side of the disc stack means; and
  bearing means for connecting said spring take-up plate means to said thrust plate means and for permitting mutual rotation therebetween;

wherein an excitation current supplied to said electromagnetic coil causes said armature plate means to be magnetically attracted to said pole piece and as a result thereof slide on said armature connection means toward said pole piece until contact therewith has been made whereupon said excitation current is reduced by a predetermined amount which provides sufficient magnetism to keep said armature plate means in contact with said pole piece, and wherein said first predetermined distance is longer than said second predetermined distance; wherein further, the movement of said armature plate means into contact with said pole piece causes said armature spring means, said spring take-up plate means, said thrust plate means and said bearing means to move with said armature plate means until said second thrust surface means forcibly abuts said second side of said disc stack means, wherein still further, said armature spring means resiliently compresses in order to accommodate the difference between said first and second predetermined distances thereby supplying a predetermined biasing force to said second thrust surface means with respect to the second side of said disc stack means so as to clamp said first and second sets of annular discs between said first thrust surface means and said second thrust surface means to thereby interconnect said first drive shaft means with said second drive shaft means.

10. The clutch unit of claim 9, wherein said armature connection means further comprises means for biasing said armature plate means away from said pole piece when no excitation current is supplied to said electromagnetic coil.

11. The clutch unit of claim 9, wherein said armature spring means comprises:
  a plurality of armature spring bolts, each armature spring bolt having a first end and an opposite second end having a head, said spring take-up plate means being slidably connected with said plurality of armature spring bolts;
  a plurality of spacers connected with said armature plate means, a respective spacer of said plurality of spacers being connected with each armature bolt at said first end thereof; and
  a plurality of armature springs, a respective armature spring of said plurality of armature springs being located on each armature bolt, said spring take-up plate being trapped on said plurality of armature bolts between said head thereof and said respective armature spring.

12. The clutch unit of claim 11, wherein said armature connection means further comprises means for biasing said armature plate means away from said pole piece when no excitation current is supplied to said electromagnetic coil.

13. The clutch unit of claim 9, wherein said disc stack means further comprises alignment pin means connected with said second set of annular discs for capturing each annular disc of said second set of annular discs and for capturing each annular disc of said first set of annular discs.

14. The clutch unit of claim 13, wherein said alignment pin means comprises:
  a plurality of alignment pins, each alignment pin of said plurality of alignment pins having an alignment pin head at a first end thereof and a threaded opposite end;
  a plurality of nuts, a nut of said plurality of nuts being threadably engaged on said threaded opposite end of each said alignment pin; and a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;

wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

15. A brake unit comprising:

a housing;

drive shaft means rotatably connected with said housing;

disc stack means having a first side and a second side, said disc stack means comprising:
- a first set of annular discs connected with said drive shaft means so as to be rotatable therewith and axially slidable with respect thereto; and
- a second set of annular discs connected with said housing so as to be nonrotatable therewith and axially slidable with respect thereto, said first set of annular discs being interleaved with said second set of annular discs;

first thrust surface means connected with said housing adjacent said first side of said disc stack means;

an electromagnetic coil assembly located within and connected to said housing, said electromagnetic coil assembly comprising an electromagnetic coil and a pole piece, said pole piece being located with respect to said electromagnetic coil so as to be magnetizable thereby; and an armature assembly located within said housing, said armature assembly comprising:
- armature plate means selectively locatable within a first predetermined distance from said pole piece;
- armature connection means for slidably connecting said armature plate means with respect to said housing so that said armature plate means may slide reciprocably between a first location whereat said armature plate means contacts said pole piece to a second location whereat said armature plate means is at said first predetermined distance from said pole piece;
- spring take-up plate means resiliently connected with said armature plate means;
- armature spring means for resiliently connecting said spring take-up plate means to said armature plate means, said armature spring means having a first end and a second end, said first end of said armature spring means being connected with said armature plate means, said second end of said armature spring means being slidably connected with said spring take-up plate means; and
- second thrust surface means for selectively contacting said second side of said disc stack means, said second thrust surface means being connected with said spring take-up plate means, said second thrust surface means being selectively locatable within a second predetermined distance from said second side of said disc stack means;

wherein an excitation current supplied to said electromagnetic coil causes said armature plate means to be magnetically attracted to said pole piece and as a result thereof slide on said armature connection means toward said pole piece until contact therewith has been made whereupon said excitation current is reduced by a predetermined amount which provides sufficient magnetism to keep said armature plate means in contact with said pole piece, and wherein said first predetermined distance is longer than said second predetermined distance; wherein further, the movement of said armature plate means into contact with said pole piece causes said armature spring means, said spring take-up plate means and said second thrust surface means to move with said armature plate means until said second thrust surface means forcibly abuts said second side of said disc stack means, wherein still further, said armature spring means resiliently compresses in order to accommodate the difference between said first and second predetermined distances thereby supplying a predetermined biasing force to said second thrust surface means with respect to the second side of said disc stack means so as to clamp said first and second sets of annular discs between said first thrust surface means and said second thrust surface means to thereby brake said drive shaft means with respect to said housing.

16. The brake unit of claim 15, wherein said armature connection means further comprises means for biasing said armature plate means away from said pole piece when no excitation current is supplied to said electromagnetic coil.

17. The brake unit of claim 15, wherein said armature spring means comprises:
- a plurality of armature spring bolts, each armature spring bolt having a first end and an opposite second end having a head, said spring take-up plate means being slidably connected with said plurality of armature spring bolts;
- a plurality of spacers connected with said armature plate means, a respective spacer of said plurality of spacers being connected with each armature bolt at said first end thereof; and
- a plurality of armature springs, a respective armature spring of said plurality of armature springs being located on each armature bolt, said spring take-up plate being trapped on said plurality of armature bolts between said head thereof and said respective armature spring.

18. The brake unit of claim 17, wherein said armature connection means further comprises means for biasing said armature plate means away from said pole piece when no excitation current is supplied to said electromagnetic coil.

19. The brake unit of claim 15, wherein said disc stack means further comprises alignment pin means connected with said second set of annular discs for capturing each annular disc of said second set of annular discs and for capturing each annular disc of said first set of annular discs.

20. The brake unit of claim 19, wherein said alignment pin means comprises:
- a plurality of alignment pins, each alignment pin of said plurality of alignment pins having an alignment pin head at a first end thereof and a threaded opposite end;

a plurality of nuts, a nut of said plurality of nuts being threadably engaged on said threaded opposite end of each said alignment pin; and a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;

wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

21. A clutch/brake unit comprising:

a housing;

first drive shaft means rotatably connected with said housing;

second drive shaft means rotatably connected with said housing;

first disc stack means having a first side and a second side, said first disc stack means comprising:
 a first set of annular discs connected with said first drive shaft means so as to be rotatable therewith and axially slidable with respect thereto; and
 a second set of annular discs connected with said second drive shaft means so as to be rotatable therewith and axially slidable with respect thereto, said first set of annular discs being interleaved with said second set of annular discs;

first thrust surface means connected with said second drive shaft means adjacent said first side of said first disc stack means;

second disc stack means having a first side and a second side, said second disc stack means comprising:
 a third set of annular discs connected with said first drive shaft means so as to be rotatable therewith and axially slidable with respect thereto; and
 a fourth set of annular discs connected with said housing so as to be nonrotatable therewith and axially slidable with respect thereto, said set of third set of annular discs being interleaved with said fourth set of annular discs;

second thrust surface means connected with said housing adjacent said first side of said second disc stack means;

an electromagnetic coil assembly located within and connected to said housing, said electromagnetic coil assembly comprising an electromagnetic coil and a pole piece, said pole piece being located with respect to said electromagnetic coil so as to be magnetizable thereby; and an armature assembly located within said housing, said armature assembly comprising:
 armature plate means selectively locatable within a first predetermined distance from said pole piece;
 third thrust surface means connected with said armature plate means for selectively contacting said second side of said second disc stack means when said armature plate means is at said first predetermined distance from said pole piece;
 armature connection means for slidably connecting said armature plate means with respect to said housing so that said armature plate means may slide reciprocably between a first location whereat said armature plate means contacts said pole piece to a second location whereat said armature plate means is at said first predetermined distance from said pole piece;
 spring take-up plate means resiliently connected with said armature plate means;
 armature spring means for resiliently connecting said spring take-up plate means to said armature plate means, said armature spring means having a first end and a second end, said first end of said armature spring means being connected with said armature plate means, said second end of said armature spring means being slidably connected with said spring take-up plate means;
 armature bias means for biasing said armature plate means away from said pole piece and toward said second disc stack means so that said third thrust surface means contacts said second side of said second disc stack means at said first predetermined distance from said pole piece when no excitation current is supplied to said electromagnetic coil;
 thrust plate means having fourth thrust surface means for selectively contacting the second side of said first disc stack means, said fourth thrust surface means being selectively locatable within a second predetermined distance from said second side of said first disc stack means; and
 bearing means for connecting said spring take-up plate means to said thrust plate means and for permitting mutual rotation therebetween;

wherein said armature bias means biases said armature plate means so that said third thrust surface means forces against said second side of said second disc stack means causing said second disc stack means to be clamped between said third thrust surface means and fourth thrust surface means thereby braking said first drive shaft means with respect to said housing; and wherein an excitation current supplied to said electromagnetic coil causes said armature plate means to be magnetically attracted to said pole piece and as a result thereof slide on said armature connection means toward said pole piece until contact therewith has been made whereupon said excitation current is reduced by a predetermined amount which provides sufficient magnetism to keep said armature plate means in contact with said pole piece, and wherein said first predetermined distance is longer than said second predetermined distance; wherein further, the movement of said armature plate means into contact with said pole piece causes said armature spring means, said spring take-up plate means, said thrust plate means and said bearing means to move with said armature plate means until said fourth thrust surface means forcibly abuts said second side of said first disc stack means, wherein still further, said armature spring means resiliently compresses in order to accommodate the difference between said first and second predetermined distances thereby supplying a predetermined biasing force to said fouth thrust surface means with respect to the second side of said first disc stack means so as to clamp said first and second sets of annular discs between said first thrust surface means and said fourth thrust surface means to thereby interconnect said first drive shaft means with said second drive shaft means, wherein further said movement of said armature means into contact with said pole piece effects to release said first drive shaft means from being braked with respect to said housing.

22. The clutch/brake unit of claim 21, wherein said armature spring means comprises:
   a plurality of armature spring bolts, each armature spring bolt having a first end and an opposite second end having a head, said spring take-up plate means being slidably connected with said plurality of armature spring bolts;
   a plurality of spacers connected with said armature plate means, a respective spacer of said plurality of spacers being connected with each armature bolt at said first end thereof; and
   a plurality of armature springs, a respective armature spring of said plurality of armature springs being located on each armature bolt, said spring take-up plate being trapped on said plurality of armature bolts between said head thereof and said respective armature spring.

23. The clutch/brake unit of claim 21, wherein said first disc stack means further comprises alignment pin means connected with said second set of annular discs for capturing each annular disc of said second set of annular discs and for capturing each annular disc of said first set of annular discs.

24. The clutch/brake unit of claim 23, wherein said alignment pin means comprises:
   a plurality of alignment pins, each alignment pin of said plurality of alignment pins having an alignment pin head at a first end thereof and a threaded opposite end;
   a plurality of nuts, a nut of said plurality of nuts being threadably engaged on said threaded opposite end of each said alignment pin; and
   a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;
   wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

25. The clutch/brake unit of claim 24, wherein said second disc stack means is structured substantially as is said first disc stack means.

26. A clutch/brake unit comprising:
   a housing;
   first drive shaft means rotatably connected with said housing;
   second drive shaft means rotatably connected with said housing;
   first disc stack means having a first side and a second side, said first disc stack means comprising:
      a first set of annular discs connected with said first drive shaft means so as to be rotatable therewith and axially slidable with respect thereto; and
      a second set of annular discs connected with said second drive shaft means so as to be rotatable therewith and axially slidable with respect thereto, said first set of annular discs being interleaved with said second set of annular discs;
   first thrust surface means connected with said second drive shaft means adjacent said first side of said first disc stack means;
   second disc stack means having a first side and a second side, said second disc stack means comprising:
      a third set of annular discs connected with said first drive shaft means so as to be rotatable therewith and axially slidable with respect thereto; and
      a fourth set of annular discs connected with said housing so as to be nonrotatable therewith and axially slidable with respect thereto, said set of third set of annular discs being interleaved with said fourth set of annular discs;
   second thrust surface means connected with said housing adjacent said first side of said second disc stack means;
   a first electromagnetic coil assembly located within and connected to said housing, said first electromagnetic coil assembly comprising a first electromagnetic coil and a first pole piece, said first pole piece being located with respect to said first electromagnetic coil so as to be magnetizable thereby;
   a clutch armature assembly located within said housing, said clutch armature assembly comprising:
      clutch armature plate means selectively locatable within a first predetermined distance from said first pole piece;
      clutch armature connection means for slidably connecting said clutch armature plate means with respect to said housing so that said clutch armature plate means may slide reciprocably between a first location whereat said clutch armature plate means contacts said first pole piece to a second location whereat said clutch armature plate means is at said first predetermined distance from said first pole piece;
      spring take-up plate means resiliently connected with said clutch armature plate means;
      armature spring means for resiliently connecting said spring take-up plate means to said clutch armature plate means, said armature spring means having a first end and a second end, said first end of said armature spring means being connected with said clutch armature plate means, said second end of said armature spring means being slidably connected with said spring take-up plate means;
      thrust plate means having third thrust surface means for selectively contacting the second side of said first disc stack means, said third thrust surface means being selectively locatable within a second predetermined distance from said second side of said first disc stack means; and
      bearing means for connecting said spring take-up plate means to said thrust plate means and for permitting mutual rotation therebetween;
   a second electromagnetic coil assembly located within and connected to said housing, said second electromagnetic coil assembly comprising a second electromagnetic coil and a second pole piece, said second pole piece being located with respect to said second electromagnetic coil so as to be magnetizable thereby;

a brake armature assembly located within said housing, said brake armature assembly comprising:

brake armature plate means selectively locatable within a third predetermined distance from said second pole piece;

brake armature connection means for slidably connecting said brake armature plate means with respect to said housing so that said brake armature plate means may slide reciprocably between a third location whereat said brake armature plate means contacts said second pole piece to a fourth location whereat said brake armature plate means is at said third predetermined distance from said second pole piece;

fourth thrust surface means connected with said brake armature plate means for selectively contacting said second side of said second disc stack means when said brake armature means is located at said third predetermined distance from said second pole piece; and brake armature bias means for biasing said brake armature plate means away from said second pole piece and toward said second disc stack means so that said fourth thrust surface selectively contacts said second side of said second disc stack means when no excitation current is supplied to said second electromagnetic coil;

wherein said brake armature bias means biases said brake armature plate means so that said fourth thrust surface means forces against said second side of said second disc stack means causing said second disc stack means to be clamped between said second thrust surface means and said fourth thrust surface means thereby braking said first drive shaft means with respect to said housing, and wherein a first excitation current supplied to said second electromagnetic coil causes said brake armature plate means to be magnetically attracted to said second pole piece and as a result thereof slide on said brake armature connection means toward said second pole piece until contact therewith has been made whereupon said first excitation current is reduced by a first predetermined amount which provides sufficient magnetism to keep said brake armature plate means in contact with said second pole piece; wherein further a second excitation current supplied to said first electromagnetic coil causes said clutch aramture plate means to be magnetically attracted to said first pole piece and as a result thereof slide on said clutch armature connection means into contact with said first pole piece until contact therewith has been made whereupon said second excitation current is reduced by a second predetermined amount which provides sufficient magnetism to keep said clutch armature plate means in contact with said first pole piece, and wherein said first predetermined distance is longer than said second predetermined distance; wherein further, the movement of said clutch armature plate means into contact with said first pole piece causes said armature spring means, said spring take-up plate means, said thrust plate means and said bearing means to move with said clutch armature plate means until said third thrust surface means forcibly abuts said second side of said first disc stack means, wherein still further, said armature spring means resiliently compresses in order to accommodate the difference between said first and second predetermined distances thereby supplying a predetermined biasing force to said third thrust surface means with respect to the second side of said first disc stack means so as to clamp said first and second sets of annular discs between said first thrust surface means and said third thrust surface means to thereby interconnect said first drive shaft means with said second drive shaft means.

27. The clutch/brake unit of claim 26, wherein said clutch armature connection means further comprises means for biasing said clutch armature plate means away from said first pole piece when no excitation current is supplied to said first electromagnetic coil.

28. The clutch/brake unit of claim 26, wherein said armature spring means comprises:

a plurality of armature spring bolts, each armature spring bolt having a first end and an opposite second end having a head, said spring take-up plate means being slidably connected with said plurality of armature spring bolts;

a plurality of spacers connected with said clutch armature plate means, a respective spacer of said plurality of spacers being connected with each armature bolt at said first end thereof; and a plurality of armature springs, a respective armature spring of said plurality of armature springs being located on each armature bolt, said spring take-up plate being trapped on said plurality of armature bolts between said head thereof and said respective armature spring.

29. The clutch/brake unit of claim 28, wherein said clutch armature connection means further comprises means for biasing said clutch armature plate means away from said first pole piece when no excitation current is supplied to said first electromagnetic coil.

30. The clutch/brake unit of claim 26, wherein said first disc stack means further comprises alignment pin means connected with said second set of annular discs for capturing each annular disc of said second set of annular discs and for capturing each annular disc of said first set of annular discs.

31. The clutch/brake unit of claim 30, wherein said alignment pin means comprises:

a plurality of alignment pins, each alignment pin of said plurality of alignment pins having an alignment pin head at a first end thereof and a threaded opposite end;

a plurality of nuts, a nut of said plurality of nuts being threadably engaged on said threaded opposite end of each said alignment pin; and a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;

wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

32. The clutch/brake unit of claim 31, wherein said second disc stack means is structured substantially as is said first disc stack means.

33. A two-speed drive unit comprising:
a housing;
first drive shaft means rotatably connected with said housing;
second drive shaft means rotatably connected with said housing;
third drive shaft means rotatably connected with said housing;
first disc stack means having a first-side and a second side, said first disc stack means comprising:
   a first set of annular discs connected with said first drive shaft means so as to be rotatable therewith and axially slidable with respect thereto; and
   a second set of annular discs connected with said second drive shaft means so as to be rotatable therewith and axially slidable with respect thereto, said first set of annular discs being interleaved with said second set of annular discs;
first thrust surface means connected with said second drive shaft means adjacent said first side of said first disc stack means;
second disc stack means having a first side and a second side, said second disc stack means comprising:
   a third set of annular discs connected with said first drive shaft means so as to be rotatable therewith and axially slidable with respect thereto; and
   a fourth set of annular discs connected with said third drive shaft means so as to be rotatable therewith and axially slidable with respect thereto, said set of third set of annular discs being interleaved with said fourth set of annular discs;
second thrust surface means connected with said third drive shaft means adjacent said first side of said second disc stack means;
a first electromagnetic coil assembly located within and connected to said housing, said first electromagnetic coil assembly comprising a first electromagnetic coil and a first pole piece, said first pole piece being located with respect to said first electromagnetic coil so as to be magnetizable thereby; and
a clutch armature assembly located within said housing, said clutch armature assembly comprising:
   clutch armature plate means selectively locatable within a first predetermined distance from said first pole piece;
   third thrust surface means connected with said clutch armature plate means for selectively contacting said second side of said second disc stack means when said clutch armature plate is at said first predetermined distance from said first pole piece;
   clutch armature connection means for slidably connecting said clutch armature plate means with respect to said housing so that said clutch armature plate means may slide reciprocably between a first location whereat said clutch armature plate means contacts said first pole piece to a second location whereat said clutch armature plate means is at said first predetermined distance from said first pole piece;
   spring take-up plate means resiliently connected with said clutch armature plate means;
   armature spring means for resiliently connecting said spring take-up plate means to said clutch armature plate means, said armature spring means having a first end and a second end, said first end of said armature spring means being connected with said clutch armature plate means, said second end of said armature spring means being slidably connected with said spring take-up plate means;
   clutch armature bias means for biasing said clutch armature plate means away from said first pole piece and toward said second disc stack means so that said third thrust surface means selectively contacts said second side of said second disc stack means when no excitation current is supplied to said first electromagnetic coil;
   thrust plate means having fourth thrust surface means for selectively contacting the second side of said first disc stack means, said fourth thrust surface means being selectively locatable within a second predetermined distance from said second side of said first disc stack means; and
   bearing means for connecting said spring take-up plate means to said thrust plate means and for permitting mutual rotation therebetween;
third disc stack means having a first side and a second side, said third disc stack means comprising:
   a fifth set of annular discs connected with said third drive shaft means so as to be rotatable therewith and axially slidable with respect thereto; and
   a sixth set of annular discs connected with said housing so as to be nonrotatable therewith and axially slidable with respect thereto, said set of fifth set of annular discs being interleaved with said sixth set of annular discs;
fifth thrust surface means connected with said housing adjacent said first side of said third disc stack means;
a second electromagnetic coil assembly located within and connected to said housing, said second electromagnetic coil assembly comprising a second electromagnetic coil and a second pole piece, said second pole piece being located with respect to said second electromagnetic coil so as to be magnetizable thereby; and
a brake armature assembly located within said housing, said brake armature assembly comprising:
   brake armature plate means selectively locatable within a third predetermined distance from said second pole piece;
   brake armature connection means for slidably connecting said brake armature plate means with respect to said housing so that said brake armature plate means may slide reciprocably between a third location whereat said brake armature plate means contacts said second pole piece to a fourth location whereat said brake armature plate means is at said third predetermined distance from said second pole piece;
   sixth thrust surface means connected with said brake armature plate means for selectively contacting said second side of said third disc stack means when said brake armature plate means is at said third predetermined distance from said second pole piece; and
   brake armature bias means for biasing said brake armature plate means away from said second pole piece and toward said third disc stack means so that said sixth thrust surface means selectively contacts said second side of said disc stack means when no excitation current is supplied to said second electromagnetic coil;

wherein said brake armature bias means biases said brake armature plate means so that said sixth thrust surface means forces against said second side of said third disc stack means causing said third disc stack means to be clamped between said fifth thrust surface means and said sixth thrust surface means thereby braking said third drive shaft means with respect to said housing, and wherein a first excitation current supplied to said second electromagnetic coil causes said brake armature plate means to be magnetically attracted to said second pole piece and as a result thereof slide on said brake armature connection means toward said second pole piece until contact therewith has been made whereupon said first excitation current is reduced by a first predetermined amount which provides sufficient magnetism to keep said brake armature plate means in contact with said second pole piece, said movement of said brake armature means into contact with said second pole piece releasing said third drive shaft means from being braked with respect to said housing; further wherein said clutch armature bias means biases said clutch armature plate means so that said fourth thrust surface means forces against said second side of said second disc stack means causing said second disc stack means to be clamped between said second thrust surface means and said fourth thrust surface means thereby connecting said first drive shaft means with respect to said third drive shaft means; and wherein further a second excitation current supplied to said first electromagnetic coil causes said clutch armature plate means to be magnetically attracted to said first pole piece and as a result thereof slide on said clutch armature connection means toward said first pole piece until contact therewith has been made whereupon said second excitation current is reduced by a predetermined amount which provides sufficient magnetism to keep said clutch armature plate means in contact with said first pole piece, and wherein said first predetermined distance is longer than said second predetermined distance; wherein further, the movement of said armature plate means into contact with said first pole piece causes said armature spring means, said spring take-up plate means, said thrust plate means and said bearing means to move with said clutch armature plate means until said third thrust surface means forcibly abuts said second side of said first disc stack means, wherein still further, said armature spring means resiliently compresses in order to accommodate the difference between said first and second predetermined distances thereby supplying a predetermined biasing force to said third thrust surface means with respect to the second side of said first disc stack means so as to clamp said first and second sets of annular discs between said first thrust surface means and said third thrust surface means to thereby interconnect said first drive shaft means with said second drive shaft means.

34. The two-speed drive unit of claim 33, wherein said armature spring means comprises:
a plurality of armature spring bolts, each armature spring bolt having a first end and an opposite second end having a head, said spring take-up plate means being slidably connected with said plurality of armature spring bolts;
a plurality of spacers connected with said armature plate means, a respective spacer of said plurality of spacers being connected with each armature bolt at said first end thereof; and
a plurality of armature springs, a respective armature spring of said plurality of armature springs being located on each armature bolt, said spring take-up plate being trapped on said plurality of armature bolts between said head thereof and said respective armature spring.

35. The two-speed drive unit of claim 33, wherein said first disc stack means further comprises alignment pin means connected with said second set of annular discs for capturing each annular disc of said second set of annular discs and for capturing each annular disc of said first set of annular discs.

36. The two-speed drive unit of claim 35, wherein said alignment pin means comprises:
a plurality of alignment pins, each alignment pin of said plurality of alignment pins having an alignment pin head at a first end thereof and a threaded opposite end;
a plurality of nuts, a nut of said plurality of nuts being threadably engaged on said threaded opposite end of each said alignment pin; and
a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;
wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

37. The two-speed drive unit of claim 36, wherein each of said second and third disc stack means are structured substantially as is said first disc stack means.

38. A two-speed drive unit comprising:
a housing;
first drive shaft means rotatably connected with said housing;
second drive shaft means rotatably connected with said housing;
third drive shaft means rotatably connected with said housing;
first disc stack means having a first side and a second side, said first disc stack means comprising:
a first set of annular discs connected with said first drive shaft means so as to be rotatable therewith and axially slidable with respect thereto; and
a second set of annular discs connected with said second drive shaft means so as to be rotatable therewith and axially slidable with respect thereto, said first set of annular discs being interleaved with said second set of annular discs;
first thrust surface means connected with said second drive shaft means adjacent said first side of said first disc stack means;

second disc stack means having a first side and a second side, said second disc stack means comprising:
- a third set of annular discs connected with said first drive shaft means so as to be rotatable therewith and axially slidable with respect thereto; and
- a fourth set of annular discs connected with said housing so as to be nonrotatable therewith and axially slidable with respect thereto, said set of third set of annular discs being interleaved with said fourth set of annular discs;

third disc stack means having a first side and a second side, said third disc stack means comprising:
- a fifth set of annular discs connected with said first drive shaft means so as to be rotatable therewith and axially slidable with respect thereto; and
- a sixth set of annular discs connected with said third drive shaft means so as to be rotatable therewith and axially slidable with respect thereto, said fifth set of annular discs being interleaved with said sixth set of annular discs;

second thrust surface means connected with said third drive shaft means adjacent said first side of said third disc stack means;

a first electromagnetic coil assembly located within and connected to said housing, said first electromagnetic coil assembly comprising a first electromagnetic coil and a first pole piece, said first pole piece being located with respect to said first electromagnetic coil so as to be magnetizable thereby;

a first armature assembly located within said housing, said first armature assembly comprising:
- first armature plate means selectively locatable within a first predetermined distance from said first pole piece;
- third thrust surface means connected with said first armature plate means for selectively contacting said first side of said second disc stack means when said first armature plate means is at said first predetermined distance from said first pole piece;
- first armature connection means for slidably connecting said first armature plate means with respect to said housing so that said first armature plate means may slide reciprocably between a first location whereat said first armature plate means contacts said first pole piece to a second location whereat said first armature plate means is at said first predetermined distance from said first pole piece;
- first spring take-up plate means resiliently connected with said first armature plate means;
- first armature spring means for resiliently connecting said first spring take-up plate means to said first armature plate means, said first armature spring means having a first end and a second end, said first end of said first armature spring means being connected with said first armature plate means, said second end of said first armature spring means being slidably connected with said first spring take-up plate means;
- first armature bias means for biasing said first armature plate means away from said first pole piece and toward said second disc stack means so that said third thrust surface means selectively contacts said first side of said second disc stack means when no excitation current is supplied to said first electromagnetic coil;
- first thrust plate means having fourth thrust surface means for selectively contacting the second side of said first disc stack means, said fourth thrust surface means being selectively locatable within a second predetermined distance from said second side of said first disc stack means; and
- first bearing means for connecting said first spring take-up plate means to said first thrust plate means and for permitting mutual rotation therebetween;

a second electromagnetic coil assembly located within and connected to said housing, said second electromagnetic coil assembly comprising a second electromagnetic coil and a second pole piece, said second pole piece being located with respect to said second electromagnetic coil so as to be magnetizable thereby; and a second armature assembly located within said housing, said second armature assembly comprising:
- second armature plate means selectively locatable within a third predetermined distance from said second pole piece;
- fifth thrust surface means connected with said second armature plate means for selectively contacting said second side of said second disc stack means when said second armature plate means is at said third predetermined distance from said second pole piece;
- second armature connection means for slidably connecting said second armature plate means with respect to said housing so that said second armature plate means may slide reciprocably between a third location whereat said second armature plate means contacts said second pole piece to a fourth location whereat said second armature plate means is at said third predetermined distance from said second pole piece;
- second spring take-up plate means resiliently connected with said second armature plate means;
- second armature spring means for resiliently connecting said second spring take-up plate means to said second armature plate means, said second armature spring means having a first end and a second end, said first end of said second armature spring means being connected with said second armature plate means, said second end of said second armature spring means being slidably connected with said second spring take-up plate means;
- second armature bias means for biasing said second armature plate means away from said second pole piece and toward said second disc stack means so that said fifth thrust surface selectively contacts said second side of said second disc stack means when no excitation current is supplied to said second electromagnetic coil;
- second thrust plate means having a sixth thrust surface means for selectively contacting the second side of said third disc stack means, said sixth thrust surface means being selectively locatable within a fourth predetermined distance from said second side of said third disc stack means; and
- second bearing means for connecting said second spring take-up plate means to said second thrust plate means and for permitting mutual rotation therebetween;

wherein said first and second armature bias means bias respectively each of said first and second armature plate means so that said third thrust surface means and said fifth thrust surface means force respectively against said first and second sides of said second disc stack means causing said second disc stack means to be clamped between said third thrust surface means and said fifth thrust surface means thereby braking said first drive shaft means with respect to said housing; wherein further a first excitation current supplied to said first electromagnetic coil causes said first armature plate means to be magnetically attracted to said first pole piece and as a result thereof slide on said first armature connection means toward said first pole piece until contact therewith has been made whereupon said first excitation current is reduced by a first predetermined amount which provides sufficient magnetism to keep said first armature plate means in contact with said first pole piece, and wherein said first predetermined distance is longer than said second predetermined distance; wherein further, the movement of said first armature plate means into contact with said first pole piece causes said first armature spring means, said first spring take-up plate means, said first thrust plate means and said first bearing means to move with said first armature plate means until said fourth thrust surface means forcibly abuts said second side of said first disc stack means, wherein, said first armature spring means resiliently compresses in order to accommodate the difference between said first and second predetermined distances thereby supplying a first predetermined biasing force to said fourth thrust surface means with respect to the second side of said first disc stack means so as to clamp said first and second sets of annular discs between said first thrust surface means and said fourth thrust surface means to thereby interconnect said first drive shaft means with said second drive shaft means; wherein further a second excitation current supplied to said second electromagnetic coil causes said second armature plate means to be magnetically attracted to said second pole piece and as a result thereof slide on said second armature connection means toward said second pole piece until contact therewith has been made whereupon said second excitation current is reduced by a second predetermined amount which provides sufficient magnetism to keep said second armature plate means in contact with said second pole piece, and wherein said third predetermined distance is longer than said fourth predetermined distance; wherein further, the movement of said second armature plate means into contact with said second pole piece causes said second armature spring means, said second spring take-up plate means, said second thrust plate means and said second bearing means to move with said second armature plate means until said sixth thrust surface means forcibly abuts said second side of said second disc stack means, wherein, said second armature spring means resiliently compresses in order to accommodate the difference between said third and fourth predetermined distances thereby supplying a second predetermined biasing force to said sixth thrust surface means with respect to the second side of said second disc stack means so as to clamp said third and fourth sets of annular discs between said fifth thrust surface means and said sixth thrust surface means to thereby interconnect said first drive shaft means with said third drive shaft means.

39. The two-speed drive unit of claim 38, wherein said armature spring means comprises:
    a plurality of armature spring bolts, each armature spring bolt having a first end and an opposite second end having a head, said spring take-up plate means being slidably connected with said plurality of armature spring bolts;
    a plurality of spacers connected with said armature plate means, a respective spacer of said plurality of spacers being connected with each armature bolt at said first end thereof; and
    a plurality of armature springs, a respective armature spring of said plurality of armature springs being located on each armature bolt, said spring take-up plate being trapped on said plurality of armature bolts between said head thereof and said respective armature spring.

40. The two-speed drive unit of claim 38, wherein said first disc stack means further comprises alignment pin means connected with said second set of annular discs for capturing each annular disc of said second set of annular discs and for capturing each annular disc of said first set of annular discs.

41. The two-speed drive unit of claim 40, wherein said alignment pin means comprises:
    a plurality of alignment pins, each alignment pin of said plurality of alignment pins having an alignment pin head at a first end thereof and a threaded opposite end;
    a plurality of nuts, a nut of said plurality of nuts being threadably engaged on said threaded opposite end of each said alignment pin; and
    a plurality of wave washers, wherein each annular disc of said second set of annular discs is separated from each adjacent annular disc of said second set of annular discs by a respective set of wave washers, one wave washer of said respective set of wave washers being carried on each said alignment pin of said plurality of alignment pins;
    wherein each annular disc of said second set of annular discs is provided with a plurality of alignment pin holes, an alignment pin of said plurality of alignment pins extending through each alignment pin hole of said plurality of alignment pin holes, said first and second sets of annular discs being captured between said alignment pin head and said nut of each said alignment pin.

42. The two-speed drive unit of claim 41, wherein said second and third disc stack means are structured substantially as is said first disc stack means.

* * * * *